US011179636B2

United States Patent
Kimura

(10) Patent No.: US 11,179,636 B2
(45) Date of Patent: Nov. 23, 2021

(54) NON-TRANSITORY COMPUTER-READABLE STORAGE MEDIUM WITH EXECUTABLE INFORMATION PROCESSING PROGRAM STORED THEREON, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Miyuki Kimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 15 days.

(21) Appl. No.: 16/848,049

(22) Filed: Apr. 14, 2020

(65) Prior Publication Data

US 2020/0360814 A1   Nov. 19, 2020

(30) Foreign Application Priority Data

May 16, 2019   (JP) .............................. JP2019-093188

(51) Int. Cl.
*A63F 13/40* (2014.01)
*A63F 13/57* (2014.01)
(Continued)

(52) U.S. Cl.
CPC .............. *A63F 13/57* (2014.09); *A63F 13/56* (2014.09); *A63F 13/65* (2014.09); *A63F 13/803* (2014.09)

(58) Field of Classification Search
CPC .......... A63F 13/40; A63F 13/42; A63F 13/44; A63F 13/45; A63F 13/537;
(Continued)

(56) References Cited

U.S. PATENT DOCUMENTS 10,232,272 B2 *   3/2019   Marr ..................... A63F 13/792
10,335,692 B2 *   7/2019   Kao ........................ A63F 13/86
(Continued)

FOREIGN PATENT DOCUMENTS

JP          08-332280       12/1996
JP          2006-149577      6/2006
(Continued)

OTHER PUBLICATIONS

MarioKart 8 Deluxe Perfect Guide Hyper ∞, Kadokawa Dwango Corporation, Jun. 2, 2017, pp. 10, 51-57, 92, 95, 115, 137 (15 total pages).

(Continued)

*Primary Examiner* — Omkar A Deodhar
(74) *Attorney, Agent, or Firm* — Nixon & Vanderhye PC

(57) ABSTRACT

An information processing apparatus obtains at least one piece of history information that allows identification of a first travel route over which a game object has traveled in a first race run in a virtual game stage, executes a second race run in the virtual game stage, in which a game event occurs independently of the first race and in which a player object and at least one non-player object participate, associates the history information with the non-player object for the second race, and determines in the second race, over which of the first travel route identified by the associated history information and a second travel route different from the first travel route the non-player object is to travel, depending on a race state resulting from the game event that occurs in the second race.

22 Claims, 18 Drawing Sheets

(51) Int. Cl.
    *A63F 13/803* (2014.01)
    *A63F 13/65* (2014.01)
    *A63F 13/56* (2014.01)

(58) Field of Classification Search
    CPC .... A63F 13/55–57; A63F 13/70; A63F 13/79; A63F 2300/554; A63F 2300/5573; A63F 2300/63; A63F 2300/646; A63F 2300/65; A63F 2300/8082
    See application file for complete search history.

(56) References Cited

U.S. PATENT DOCUMENTS

| | | | |
|---|---|---|---|
| 2006/0135236 A1 | 6/2006 | Sato et al. | |
| 2009/0093313 A1 | 4/2009 | Yabuki et al. | |

FOREIGN PATENT DOCUMENTS

| | | |
|---|---|---|
| JP | 2009-011371 | 1/2009 |
| JP | 2009-089737 | 4/2009 |
| JP | 2010-200830 | 9/2010 |

OTHER PUBLICATIONS

"The Official Website of 'F1 Race Stars' Opens Today From Jan. 15th", Jan. 15, 2013, Kadokawa Game Linkage Inc., retrieved on Sep. 17, 2021, 5 pages (English translation of website retrieved Oct. 6, 2021, 3 pages). https://www.famitsu.com/news/201301/15027260.html.

Notice of Reasons for Refusal dated Sep. 17, 2021 in corresponding Japanese Application No. 2019-093188 (with translation), 6 pages.

\* cited by examiner

FIG.7

| | No. | GAME OBJECT | CHARACTER | OPERATION SOURCE |
|---|---|---|---|---|
| 340 | 1 | PLAYER OBJECT | CHARACTER 1 | OPERATION BY PLAYER |
| 342 | 2 | NON-PLAYER OBJECT 1 | CHARACTER 2 | HISTORY INFORMATION A |
| | 3 | NON-PLAYER OBJECT 2 | CHARACTER 3 | HISTORY INFORMATION B |
| | 4 | NON-PLAYER OBJECT 3 | CHARACTER 4 | HISTORY INFORMATION C |
| | 5 | NON-PLAYER OBJECT 4 | CHARACTER 5 | HISTORY INFORMATION D |
| | 6 | NON-PLAYER OBJECT 5 | CHARACTER 6 | HISTORY INFORMATION E |

FIG.8A  ACTUAL TRAVEL ROUTE
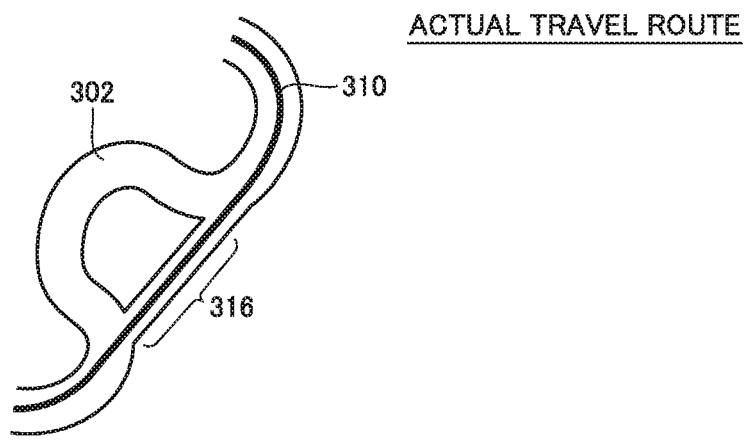
FIG.8B  SAME ROUTE
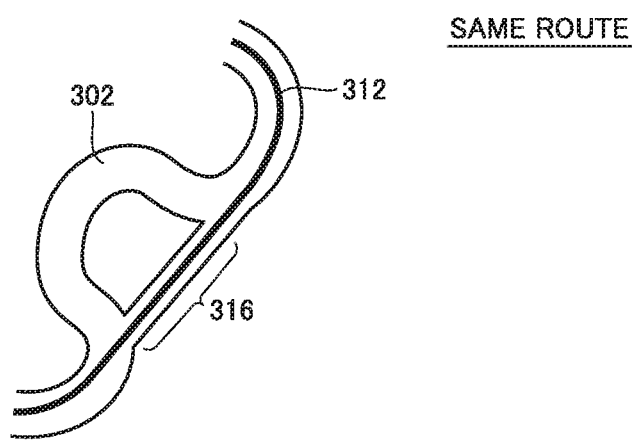
FIG.8C  CHANGED ROUTE
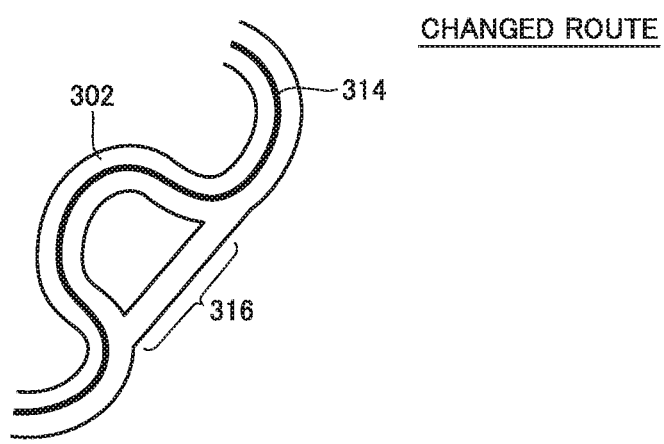

ACTUAL TRAVEL ROUTE

SAME ROUTE

CHANGED ROUTE

FIG.15

| SPECIFIC ITEM TYPE | EFFECT OF ITEM | |
|---|---|---|
| SPEED-UP ITEM | INCREASE IN TRAVEL SPEED | ~330 |
| TRAVEL PERMISSION ITEM | TRAVEL OVER ROUTE WHERE ONE IS NORMALLY NOT PERMITTED TO TRAVEL | ~332 |

NON-TRANSITORY COMPUTER-READABLE
STORAGE MEDIUM WITH EXECUTABLE
INFORMATION PROCESSING PROGRAM
STORED THEREON, INFORMATION
PROCESSING APPARATUS, INFORMATION
PROCESSING SYSTEM, AND
INFORMATION PROCESSING METHOD

This nonprovisional application is based on Japanese Patent Application No. 2019-093188 filed with the Japan Patent Office on May 16, 2019, the entire contents of which are hereby incorporated by reference.

FIELD

The present disclosure relates to a non-transitory computer-readable storage medium with an executable information processing program stored thereon for executing a race in which a player object and a non-player object can participate, an information processing apparatus, an information processing system, and an information processing method.

BACKGROUND AND SUMMARY

Conventionally in a race game or the like, a virtual player generated by a computer in addition to a real player can participate in and proceed with a game. For example, a game system that enhances enjoyment of a game by having a player feel like playing against other players has been known. More specifically, a configuration for reproducing a past operation history of a player by using a ghost character representing an object of which operation is controlled based on an operation history of a horse object input from a game terminal device by the player in control of races run in the past has been disclosed.

In the conventional technique described above, the ghost character that reproduces the past operation history of the player as it is is used. Therefore, operation control in accordance with a condition of an actual race is not carried out and an unnatural behavior may be exhibited.

The present disclosure is directed to a solution to such a problem, and an object of the present disclosure is to provide a configuration allowing more natural operation control in accordance with a condition of a race executed in a virtual game stage.

An exemplary embodiment provides a non-transitory computer-readable storage medium with an executable information processing program stored thereon, the information processing program being executed by a computer of an information processing apparatus. The information processing program causes the computer to perform obtaining at least one piece of history information that allows identification of a first travel route over which a game object has traveled in a first race run in a virtual game stage and executing a second race run in the virtual game stage where a game event occurs independently of the first race. In the second race, a player object and at least one non-player object participate. The information processing program causes the computer to perform associating the history information with the non-player object for the second race, determining in the second race, over which of the first travel route identified by the associated history information and a second travel route different from the first travel route the non-player object is to travel, depending on a race state resulting from the game event that occurs in the second race, and managing an item possessed by the non-player object. The race state includes a state of the item possessed by the non-player object.

According to the present configuration, by selecting a travel route depending on a race state resulting from a game event, more natural operation control can be achieved in accordance with a condition of a race executed in the virtual game stage.

Furthermore, according to the present configuration, by selecting a travel route depending on a state of possession of an item to be used in the race also for a non-player object, more natural operation control for a non-player object state can be achieved.

The determining may include determining, when the item possessed by the non-player object does not include a specific item, that the non-player object is to travel over the second travel route. According to the present configuration, by selecting a travel route based on whether or not a specific item is possessed, operation control more strongly reflecting a condition of a race can be achieved.

The managing an item may include allowing, when the item possessed by the non-player object includes the specific item, the non-player object to use the specific item. The determining may include determining that the non-player object is to travel over the first travel route. According to the present configuration, since travel over a route where a game object is not permitted to travel without use of a specific item can be determined based on whether or not a specific item is possessed, operation control more strongly reflecting a condition of a race can be achieved.

The first travel route may be a travel route where a travel speed of the non-player object is lowered as compared with a speed of travel over the second travel route. According to the present configuration, zest of a race can be enhanced by increasing a variable factor in the race such as change in travel speed.

The managing an item may include allowing, when the item possessed by the non-player object includes a specific item, the non-player object to use the specific item, and the determining may include determining that the non-player object is to travel over the second travel route. According to the present configuration, since travel over a route where a game object is not permitted to travel without use of a specific item can be determined based on whether or not a specific item is possessed, operation control more strongly reflecting a condition of a race can be achieved.

The determining may include determining, when the item possessed by the non-player object does not include the specific item, that the non-player object is to travel over the first travel route. According to the present configuration, by selecting a travel route based on whether or not a specific item is possessed, operation control more strongly reflecting a condition of a race can be achieved.

The first travel route may be a travel route where a travel speed of the non-player object is increased as compared with a speed of travel over the second travel route. According to the present configuration, zest of a race can be enhanced by increasing a variable factor in the race such as change in travel speed.

The specific item may serve to increase a travel speed of the non-player object as compared with a travel speed when the non-player object does not use the specific item. According to the present configuration, zest of a race can be enhanced by reflecting a rule in a real race.

The specific item may permit travel over a route where the non-player object is not permitted to travel without use of the specific item by the non-player object. According to the present configuration, zest of a race can be enhanced by reflecting a rule in a real race.

The managing an item may include allowing use of the item possessed by the non-player object in accordance with a predetermined order of use, and when the specific item possessed by the non-player object is in a position second or later in the order of use, until the specific item is in a position first in the order of use, causing the non-player object to use an item other than the specific item earlier than when the specific item is not included. According to the present configuration, operation control in line with an operation as performed by a real user can be achieved.

The managing an item may include allowing the non-player object to continue to possess the specific item until the non-player object reaches the vicinity of a starting point of the second travel route when the specific item possessed by the non-player object is in a position first in the order of use. According to the present configuration, operation control in line with an operation as performed by a real user can be achieved.

The game event may include providing the item to the non-player object based on a probability in the second race. According to the present configuration, by randomly generating a game event that occurs in a race, zest of the race can be enhanced.

The second travel route may include a route branched off from the first travel route. According to the present configuration, such a game effect as branch-off from a normal route can be realized.

The race state may include whether or not travel performance of the non-player object has changed as compared with travel performance in a normal state. According to the present configuration, by selecting a travel route in accordance with travel performance of the non-player object, operation control more strongly reflecting a condition of a race can be achieved.

The travel performance may include setting the non-player object to a lower-speed state than in the normal state. According to the present configuration, operation control in line with real running can be achieved.

The race state may include a state of the virtual game stage. According to the present configuration, more natural operation control can be achieved in accordance with an event that occurs in a game stage.

The determining may include determining, when there is an obstacle object on the first travel route, that the non-player object is to travel over the second travel route. According to the present configuration, operation control in line with an operation as performed by a real user can be achieved.

The second travel route may include a route different in radius of curvature from the first travel route. According to the present configuration, operation control in line with real running can be achieved.

The history information may include at least one of information on a position and information on input information. According to the present configuration, the travel route of the non-player object can more accurately be identified. Furthermore, according to the present configuration, information for identifying a travel route can be stored with a smaller amount of information being spent.

Another exemplary embodiment provides an information processing apparatus that includes a memory storing a computer-readable program and one or more processors. The processors, when executing the computer-readable program, perform obtaining at least one piece of history information that allows identification of a first travel route over which a game object has traveled in a first race run in a virtual game stage and executing a second race run in the virtual game stage where a game event occurs independently of the first race. In the second race, a player object and at least one non-player object participate. The processors further perform associating the history information with the non-player object for the second race, determining in the second race, over which of the first travel route identified by the associated history information and a second travel route different from the first travel route the non-player object is to travel, depending on a race state resulting from the game event that occurs in the second race, and managing an item possessed by the non-player object. A state of the non-player object includes a state of the item possessed by the non-player object.

Another exemplary embodiment provides an information processing system that includes a display, an input device, and a processing unit that communicates with the display and the input device. The processing unit is configured to obtain at least one piece of history information that allows identification of a first travel route over which a game object has traveled in a first race run in a virtual game stage and execute a second race run in the virtual game stage where a game event occurs independently of the first race. In the second race, a player object and at least one non-player object participate. The processing unit is configured to associate the history information with the non-player object for the second race, determine in the second race, over which of the first travel route identified by the associated history information and a second travel route different from the first travel route the non-player object is to travel, depending on a race state resulting from the game event that occurs in the second race, and manage an item possessed by the non-player object. A state of the non-player object includes a state of the item possessed by the non-player object.

Another exemplary embodiment provides an information processing method performed in a computer of an information processing apparatus. The information processing method includes obtaining at least one piece of history information that allows identification of a first travel route over which a game object has traveled in a first race run in a virtual game stage and executing a second race run in the virtual game stage where a game event occurs independently of the first race. In the second race, a player object and at least one non-player object participate. The information processing method includes associating the history information with the non-player object for the second race, determining in the second race, over which of the first travel route identified by the associated history information and a second travel route different from the first travel route the non-player object is to travel, depending on a race state resulting from the game event that occurs in the second race, and managing an item possessed by the non-player object. A state of the non-player object includes a state of the item possessed by the non-player object.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 shows an exemplary illustrative non-limiting drawing illustrating an exemplary game object that participates in a race executed in the information processing apparatus according to the present embodiment.

FIGS. 8A to 8C and 9A to 9C show exemplary illustrative non-limiting drawings illustrating exemplary processing involved with route selection in the information processing apparatus according to the present embodiment.

FIG. 15 shows an exemplary illustrative non-limiting drawing illustrating an exemplary specific item generated in the race executed in the information processing apparatus according to the present embodiment.

DETAILED DESCRIPTION OF NON-LIMITING EXAMPLE EMBODIMENTS

Figure 1:
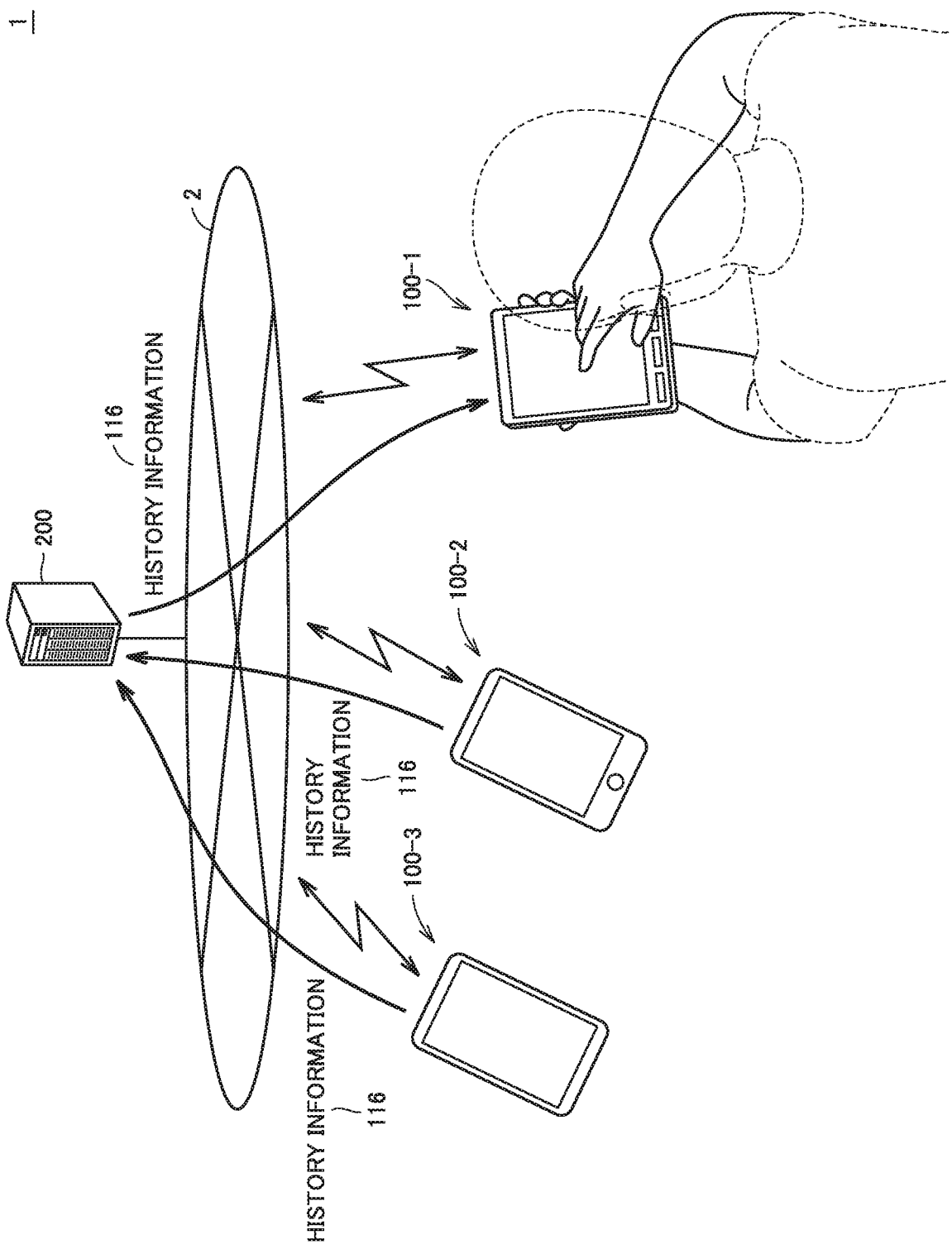
FIG. 1 shows an exemplary illustrative non-limiting drawing illustrating an information processing system according to the present embodiment.

The present embodiment will be described in detail with reference to the drawings. The same or corresponding elements in the drawings have the same reference characters allotted and description thereof will not be repeated.

[A. Hardware Configuration]

An exemplary hardware configuration of a game system 1 according to the present embodiment will initially be described.

(a1: Exemplary Overall Configuration)

Referring to FIG. 1, game system 1 typically includes at least one information processing apparatus 100-1, 100-2, 100-3, . . . (which is also collectively referred to as an "information processing apparatus 100" below) and a management server 200.

Information processing apparatus 100 is implemented by any type of a computer, and performs a function necessary for performing game processing as will be described later, by executing an information processing program stored in advance. As game processing is performed, information processing apparatus 100 generates history information 116 and transmits generated history information 116 to management server 200. Management server 200 stores history information 116 transmitted from at least one information processing apparatus 100, and as execution of new game processing is started in any information processing apparatus 100, management server 200 provides history information 116 selected from stored history information 116. Information processing apparatus 100 performs game processing based on history information 116 provided by management server 200. Details of history information 116 and game processing using history information 116 will be described later.

Management server 200 is typically implemented by at least one processor. Management server 200 stores history information 116 transmitted from information processing apparatus 100 and transmits at least one piece of history information 116 among pieces of stored history information 116 in response to a request from information processing apparatus 100. Management server 200 may perform a function to provide an application program to information processing apparatus 100.

(a2: Exemplary Configuration of Information Processing Apparatus 100)

Typically, a portable (or mobile) general-purpose computer such as a smartphone or a tablet is assumed as information processing apparatus 100, however, information processing apparatus 100 may be implemented by a portable or stationary personal computer or a computer like a game console.

Figure 2:
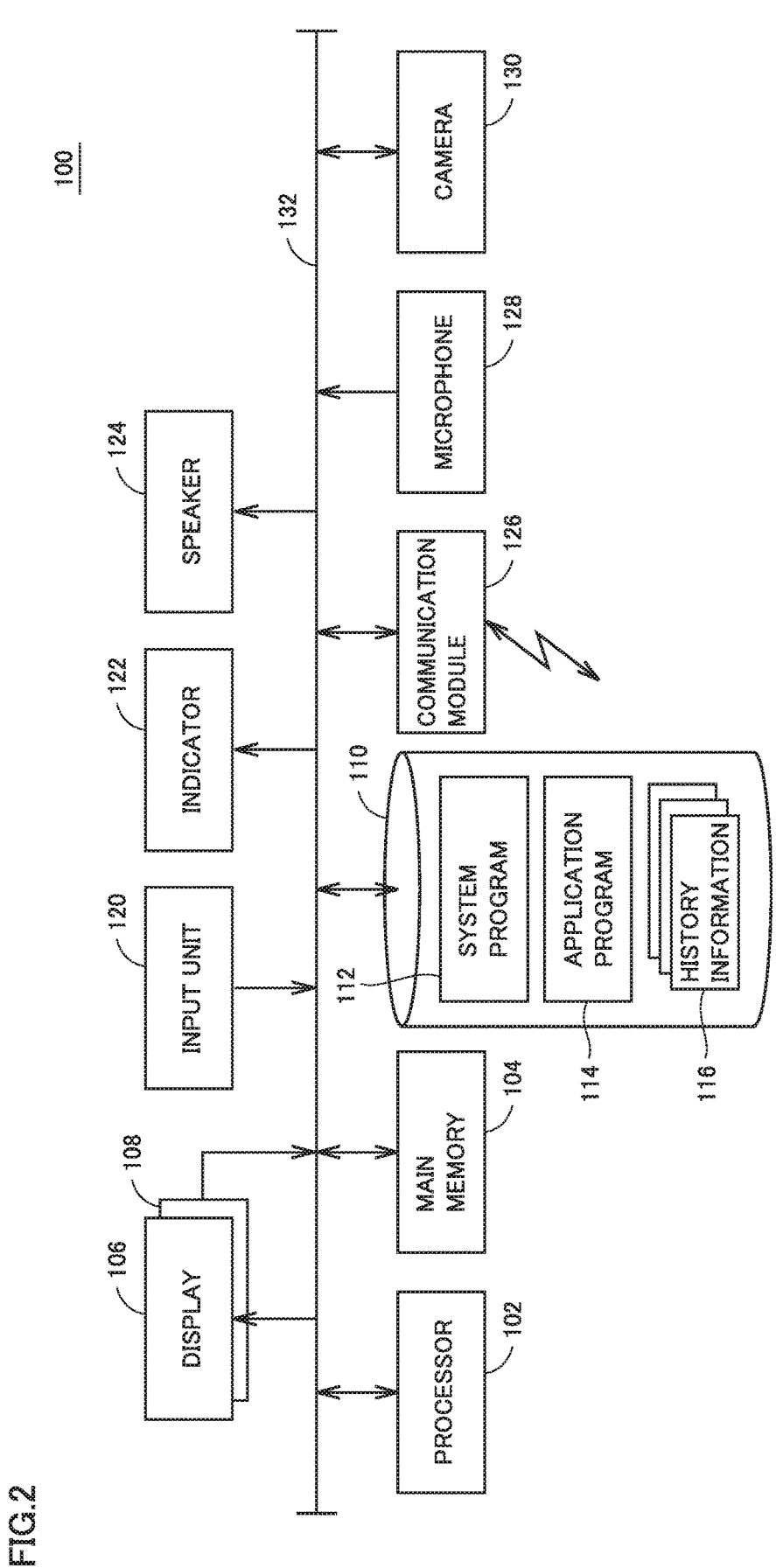
FIG. 2 shows an exemplary illustrative non-limiting drawing illustrating a hardware configuration of an information processing apparatus according to the present embodiment.

Referring to FIG. 2, information processing apparatus 100 includes as its main hardware components, a processor 102, a main memory 104, a display 106, a touch panel 108, a storage 110, an input unit 120, an indicator 122, a speaker 124, a communication module 126, a microphone 128, and a camera 130. Theses hardware components are communicatively connected to one another through a bus 132.

Processor 102 is a processing unit that executes an instruction in accordance with a program code developed on main memory 104, and implemented, for example, by a central processing unit (CPU) or a graphics processing unit (GPU).

Main memory 104 is a non-volatile storage device that temporarily stores a program code for processor 102 to execute an instruction or various types of work data, and implemented, for example, by a dynamic random access memory (DRAM) or a static random access memory (SRAM).

Display 106 shows video information generated by operation processing in processor 102, and it is implemented, for example, by a display device such as a liquid crystal display (LCD) or an organic electroluminescent (EL) display.

Touch panel 108 is arranged on a display surface of display 106 and accepts a user operation. More specifically, touch panel 108 outputs information representing a touch operation by a user to processor 102.

Storage 110 is a non-volatile storage device that stores in a non-volatile manner, data used or generated in information processing apparatus 100, and implemented, for example, by a flash memory or a hard disk drive. Typically, a system program 112 including an operating system (OS) and a driver and an application program 114 for substantially performing game processing as will be described later are stored in storage 110. Application program 114 may also perform game processing while using a library provided by system program 112.

Storage 110 may further store at least one piece of history information 116. For example, when storage of history information 116 in information processing apparatus 100 itself is adopted rather than storage of history information 116 in management server 200, a plurality of pieces of history information 116 may be stored in storage 110.

Application program 114 may be stored in storage 110 in a stage of manufacturing of information processing apparatus 100 or may be provided by downloading from any server such as management server 200 (FIG. 1). Furthermore, a computer-readable storage medium (for example, a universal serial bus (USB) memory or any memory card) (not shown) that stores application program 114 may be attached to information processing apparatus 100, and application program 114 read from the attached computer-readable storage medium may be installed in storage 110.

Input unit 120 is implemented, for example, by an input device such as at least one button that accepts a user operation and a mouse.

Indicator 122 is arranged as being exposed in a housing of information processing apparatus 100 and visually notifies a user of information processing apparatus 100 of any information. Indicator 122 is implemented, for example, by a light emitting device such as a light emitting diode (LED).

Speaker 124 is arranged as being exposed in the housing of information processing apparatus 100 and provides any audio information to a user of information processing apparatus 100.

Communication module 126 is a module for wireless communication with an external apparatus, and implemented, for example, by a wide area communication module in conformity with fifth generation (5G), long term evolution (LTE), or WiMAX or a narrow area communication module in conformity with a wireless local area network (LAN), Bluetooth®, or infrared communication.

Microphone 128 is arranged as being exposed in the housing of information processing apparatus 100 and collects voice and sound generated around information processing apparatus 100.

Camera 130 is arranged as being exposed in the housing of information processing apparatus 100 and outputs an image obtained by image pick-up around information processing apparatus 100.

Though FIG. 2 shows a form of various types of processing performed by execution of a program (system program 112 and application program 114) by processor 102 (that is, software implementation), the entirety or a part of the processing may be performed by hardwired circuitry. Specifically, processing circuitry including an application specific integrated circuit (ASIC) or a field-programmable gate array (FPGA) may be responsible for the entirety or a part of processing to be performed by information processing apparatus 100 according to the present embodiment. The processing circuitry may include processor 102 and main memory 104. Therefore, processing involved with information processing apparatus 100 according to the present embodiment can also be expressed as being performed by processing circuitry including processor 102 and main memory 104 and/or hardwired circuitry such as an ASIC or an FPGA.

(a3: Exemplary Configuration of Management Server 200)

Management server 200 is typically implemented by a networked general-purpose computer. Management server 200 may be implemented by a single computer or a plurality of computers in coordination with one another. Each computer includes at least one processor. Each processor contained in each computer may include a plurality of processor cores.

Management server 200 typically performs various types of processing as will be described later, by execution of a program by at least one processor. The entirety or a part of processing performed by management server 200 may be performed by hardwired circuitry such as an ASIC or an FPGA.

Since the hardware configuration of the general-purpose computer implementing management server 200 has been known, detailed description thereof will not be provided.

[B. Overview of Processing]

Overview of processing in game system 1 according to the present embodiment will now be described.

Figure 3:
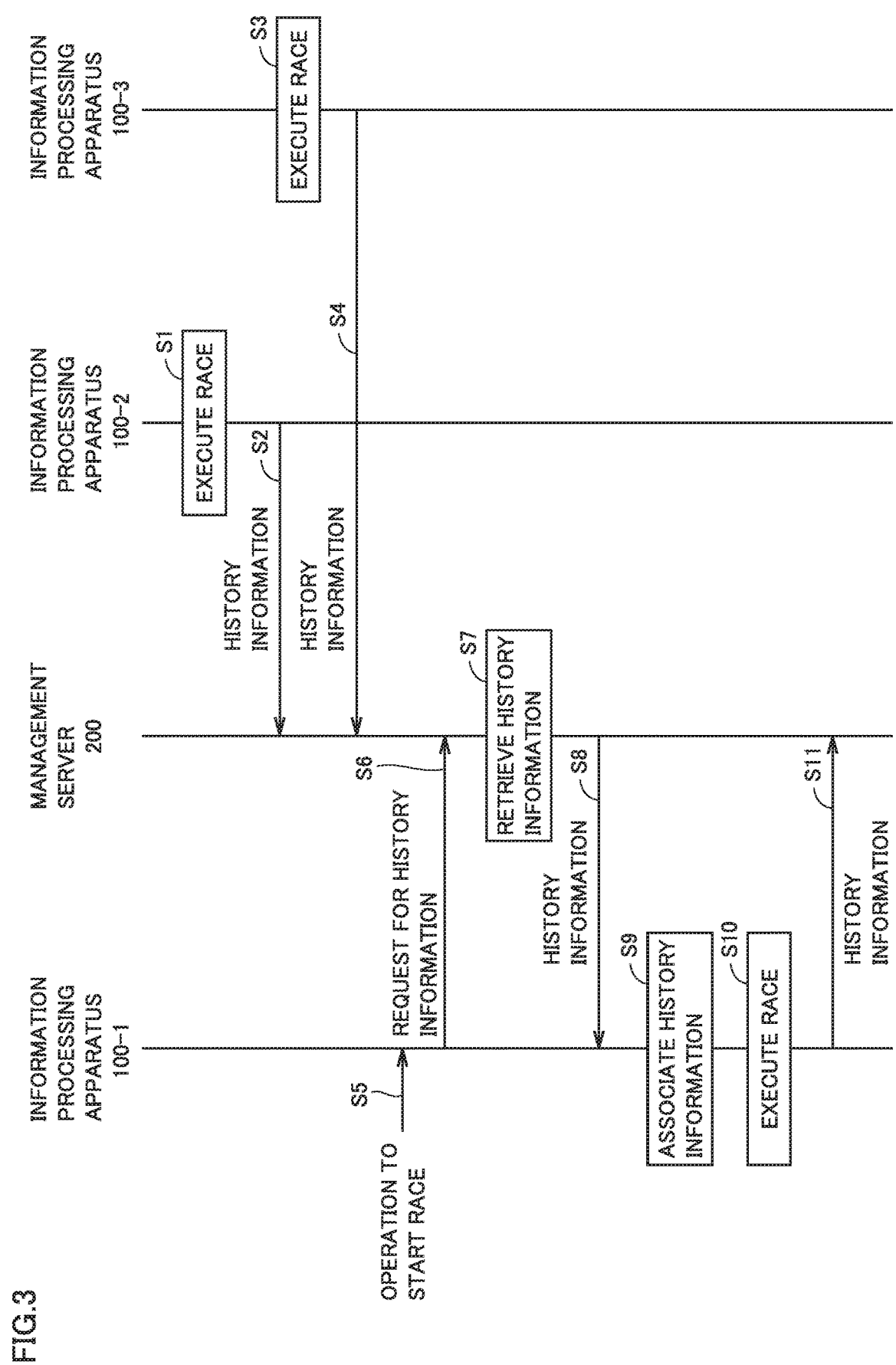
FIG. 3 shows an exemplary illustrative non-limiting sequence chart illustrating overview of processing in a game system according to the present embodiment.

Each step performed by information processing apparatus 100 shown in FIG. 3 is typically performed by execution of a program (system program 112 and application program 114) by processor 102 of information processing apparatus 100.

Referring to FIG. 3, a race (a race game) is executed first in information processing apparatus 100-2 (step S1) and history information representing a travel route of a game object obtained by execution of the race is transmitted to management server 200 (step S2). Similarly, a race is executed in information processing apparatus 100-3 (step S3) and history information representing a travel route of a game object obtained by execution of the race is transmitted to management server 200 (step S4). Any one of steps S1 and S2 and steps S3 and S4 should only be performed.

Management server 200 successively stores history information transmitted from information processing apparatuses 100-2 and 100-3.

Thereafter, when a user performs an operation onto information processing apparatus 100-1 to start a race (step S5), information processing apparatus 100-1 transmits a request for history information to management server 200 (step S6). Management server 200 retrieves history information that satisfies a condition from pieces of stored history information, in response to the request for history information from information processing apparatus 100-1 (step S7). Then, management server 200 provides the history information obtained by retrieval to information processing apparatus 100-1 (step S8).

Information processing apparatus 100-1 associates the history information from management server 200 with a non-player object (step S9) and executes the race (step S10). In execution of the race, depending on a race state resulting from a game event that occurs in the race, over which of a first travel route (an "identical route" which will be described later) identified by the associated history information and a second travel route (a "changed route" which will be described later) different from the first travel route the non-player object is to travel is sequentially determined.

Details of this determination processing will be described later.

By adopting determination processing depending on a race state resulting from such a game event, more natural operation control of a non-player object can be achieved.

After execution of the race, information processing apparatus 100-1 may transmit history information representing a travel route of a game object obtained by execution of the race to management server 200 (step S11).

In game system 1 according to the present embodiment, processing as above is repeated as appropriate.

Terms used herein will now be described.

The "race" herein encompasses a game in which players compete in ranking or time required for clearing (traveling over) a predetermined course. The "race" is not limited to a driving game but may also include an action game in which a character is moved from the start to the goal (a scroll direction may be vertical or horizontal). A race in which at least one game object can simultaneously participate is assumed herein as the "race".

The "virtual game stage" herein encompasses a course on which a race is run in a game space. A course on which a race is run is typically assumed as the "virtual game stage."

The "game object" herein encompasses any object (including a character and an item (or a game item)) arranged in a game space. Description will be given herein with attention being paid in particular to a character operable by a user or a computer, or a vehicle associated with a character by way of example of a "game object."

The "player object" and the "non-player object" herein are terms that may be encompassed in the "game object." A game object to be operated in a race run in information processing apparatus 100 to which attention is paid is referred to as a "player object" and other game objects that are not operated are referred to as "non-player objects." Though the "player object" is normally assumed to be operated by a real user (player), a computer may give an operation instruction thereto.

The "travel route" herein encompasses a route over which a game object to which attention is paid travels in a race. The "travel route" may contain information on which branch route a game object to which attention is paid has traveled on a course in a virtual game stage and information on which of the inside or the outside of the course (for example, a curve) a game object has traveled.

The "history information" herein refers to information for identifying a travel route over which a game object has traveled in any game. The "history information" may contain any content so long as it allows identification of a travel route. For example, when a group of positions indicating a route over which a game object of interest has traveled is adopted as the "history information," the travel route can be reproduced as it is. When the group of positions is adopted, time corresponding to each position (for example, time elapsed since start) may be associated therewith. Alternatively, a content of an operation instruction provided to a game object of interest (for example, a user operation accepted by input unit 120 of information processing apparatus 100) may be adopted as the "history information."

The "game event" herein encompasses any event that randomly occurs as a game proceeds. For example, the "game event" includes various variable factors such as acquisition and use of an item that is generated (randomly) while a game proceeds and ranking in a race. Therefore, a "game event" that occurs in one race does not necessarily occur in another race. In other words, normally, a game event that occurs is independent between a previously executed race and a subsequently executed race.

The "race state" herein results from a game event and encompasses a state of the entire course and a game object. For example, a game event of acquisition of an item resulting from passage of a player object or a non-player object through an item box brings about addition of the item for possession by the player object or the non-player object which has passed through the item box. A state that the item has been added may be encompassed in the "race state."

[C. Overview of Race]

An exemplary race executed in information processing apparatus 100 according to the present embodiment will now be described.

Figure 4:
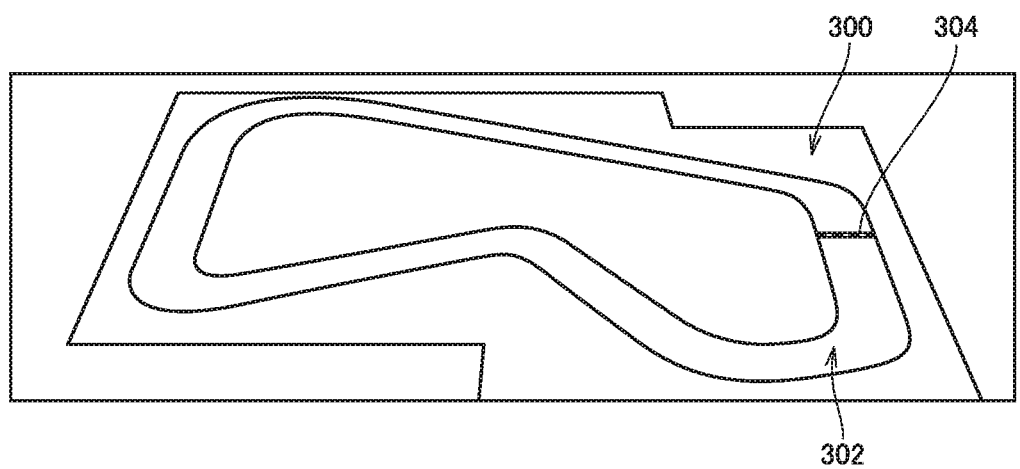
FIG. 4 shows an exemplary illustrative non-limiting drawing illustrating an exemplary race executed in the information processing apparatus according to the present embodiment.

Referring to FIG. 4, information processing apparatus 100 executes a race game in which a game object competes in ranking or time required for travel by the game object (a player object and/or a non-player object) along a course 302 provided in a virtual game stage 300. On course 302, a reference position 304 representing the start and the goal is set, and typically the course is cleared by passing reference position 304, going around course 302 a prescribed number of times, and thereafter passing again reference position 304. A race game in which the game object competes for ranking or time required for clearing (traveling over) such a predetermined course is executed in information processing apparatus 100.

A user competes in time or ranking against a non-player object by controlling travel of a player object shown in virtual game stage 300 by providing an operation instruction through an input device such as touch panel 108, input unit 120, microphone 128, or camera 130.

A point of view shown on display 106 of information processing apparatus 100 can also arbitrarily be varied.

In a race executed in information processing apparatus 100, an item may be acquired as a game event. For example, such a game event that a player object or a non-player object can acquire a randomly determined item as it passes by an object arranged in virtual game stage 300 may be implemented. Alternatively, the player object or the non-player object can also use its possessed item at any timing. By using the item, the player object may change to exhibit a more advantageous behavior than the non-player object, or the non-player object may change to exhibit a more disadvantageous behavior than the player object.

A plurality of items may be possessed in the race game. In this case, an item may be used in accordance with a predetermined order of use (typically, the order the same as the order of acquisition of items). Alternatively, possessed items may selectively or randomly be used.

[D. Functional Configuration]

Figure 5:
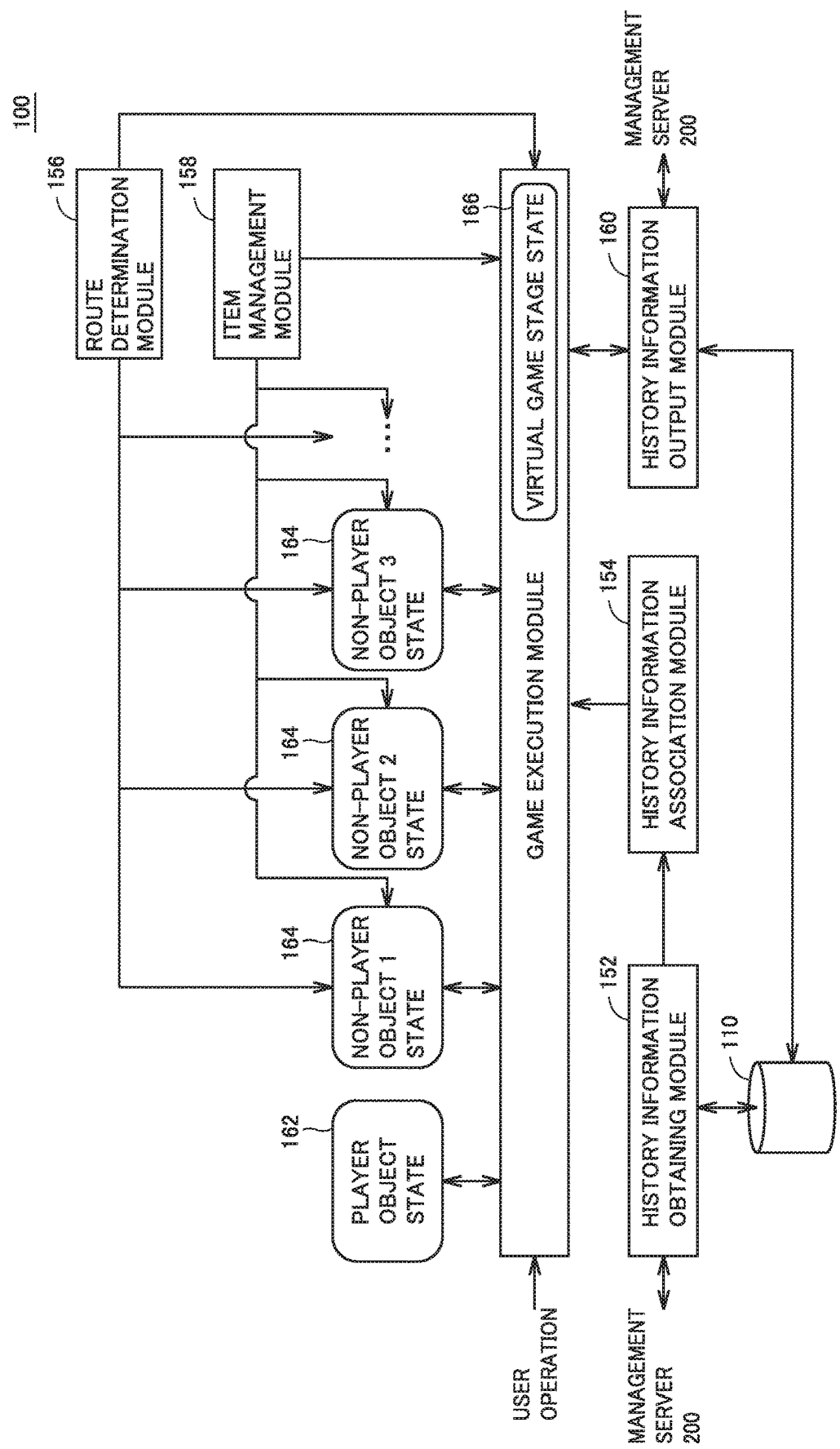
FIG. 5 shows an exemplary illustrative non-limiting block diagram illustrating a functional configuration for implementing execution of a race in the information processing apparatus according to the present embodiment.

A functional configuration shown in FIG. 5 is implemented typically by execution of an information processing program (system program 112 and/or application program 114) by processor 102 of information processing apparatus 100.

Referring to FIG. 5, information processing apparatus 100 includes as its functional configuration, a game execution module 150, a history information obtaining module 152, a history information association module 154, a route determination module 156, an item management module 158, and a history information output module 160. Information processing apparatus 100 holds a player object state 162 representing a state of a player object and at least one non-player object state 164 representing a state of at least one non-player object.

Player object state 162 and non-player object state 164 include a travel speed of a character object, a state of possession or use of an item, and a transition to a special state owing to some item.

Game execution module 150 virtually executes a race run in virtual game stage 300. Game execution module 150 generates any game event during a race based on a prescribed rule and randomness. Therefore, in races run on identical virtual game stage 300 by game execution module 150, game events occur independently of one another. Game execution module 150 holds a virtual game stage state 166 which is a state of virtual game stage 300 and sequentially updates contents of virtual game stage state 166 as the race proceeds.

A player object and at least one non-player object participate in a race executed by game execution module 150. Game execution module 150 controls an operation of the player object and the non-player object that participate in, based on player object state 162 and non-player object state 164.

History information obtaining module 152 obtains history information 116 on a previously run race. Based on obtained history information 116, a travel route over which a game object (typically, the player object) has traveled in the race previously run in virtual game stage 300 substantially the same as virtual game stage 300 where game execution module 150 executes the race can be identified. Regarding an example of substantially the same virtual game stage, a virtual game stage comparable in shape of a course in spite of a difference in weather, time (morning, afternoon, and evening), and a position of an obstacle placed on the course from virtual game stage 300 where the race has previously been executed may be regarded as the same virtual game stage 300. History information 116 may be stored in any of management server 200 and information processing apparatus 100 (typically, storage 110). History information obtaining module 152 selects a source from which history information is to be obtained, in accordance with a location where history information 116 is stored.

History information association module 154 associates history information 116 obtained by history information obtaining module 152 (obtained from the previously run race) with at least one non-player object for a race to be executed next in information processing apparatus 100. Contents of associated history information 116 may be reflected on each non-player object state 164.

Route determination module 156 determines in the race executed in information processing apparatus 100, over which of the first travel route (the "identical route" which will be described later) identified by associated history information 116 and the second travel route (the "changed route" which will be described later) different from the first travel route the non-player object is to travel, depending on a race state (including non-player object state 164) resulting from a game event that occurs in the race.

Item management module 158 manages an item possessed by a non-player object. More specifically, item management module 158 manages acquisition, possession, and use of an item for each non-player object. Item management module 158 can also allow use of an item possessed by the non-player object in accordance with a predetermined order of use. A state of an item of each non-player object managed by item management module 158 may be reflected on corresponding non-player object state 164.

When the race executed in information processing apparatus 100 ends, history information output module 160 outputs new history information representing a travel route of a game object in that race.

[E. Exemplary History Information]

Exemplary history information 116 generated by execution of a race in information processing apparatus 100 will now be described in further detail.

Figure 6B:
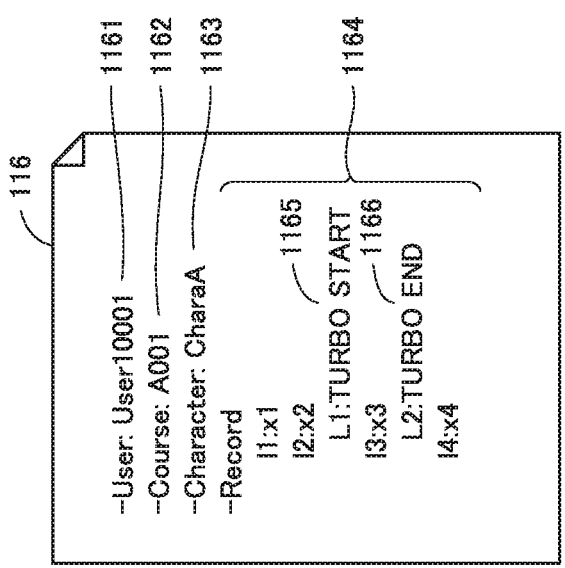
FIGS. 6A and 6B show exemplary illustrative non-limiting drawings illustrating exemplary processing for generating history information in the information processing apparatus according to the present embodiment.
Figure 6A:
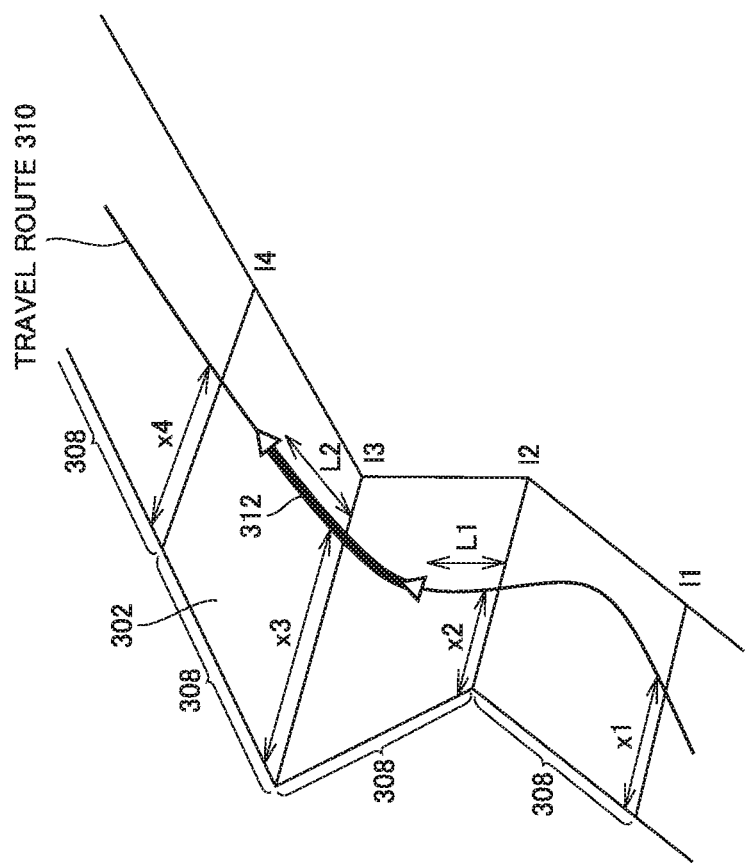

Referring to FIG. 6A, since information processing apparatus 100 can obtain an actual travel route 310 of a game object, obtained travel route 310 may be stored as it is as history information 116. In order to compress an amount of history information 116, course 302 is divided into a plurality of zones 308 along a direction of travel of the game object, and then only a position of passage over travel route 310 at a boundary between zones may be stored.

History information 116 may include information on a position of a game object. For example, positions (offset) x1, x2, x3, x4, ... of passage over each of lines 11, 12, 13, 14, ... corresponding to the boundary between zones 308 may be stored in history information 116. In this case, as shown in FIG. 6B, history information 116 may store lines 11, 12, 13, 14, ... and positions x1, x2, x3, x4, ... in association (a travel record 1164).

When the game object exhibits a special behavior on a part of travel route 310, such information may also be stored in history information 116. For example, as shown in FIG. 6A, it is assumed that the game object has exhibited a special behavior in a part of a section from line 12 to line 14 ("turbo travel" in the example shown in FIGS. 6A and 6B). For this special behavior as well, for example, a start position and an end position of the section may be defined based on distances (offset) L1 and L2 from the lines. It is defined in history information 116 shown in FIG. 6B that turbo travel starts from a point beyond line 12 by distance L1 and ends at a point beyond line 13 by distance L2 (special behavior records 1165 and 1166).

Alternatively, history information 116 may store contents of an operation instruction provided to a game object of interest (for example, a user operation accepted by input unit 120 of information processing apparatus 100) in addition to or instead of information on a position as described above. In this case, history information 116 may successively store contents (input information) of a user operation in association with time or a section. In other words, history information 116 may include information on input information such as a history of key inputs by a user.

History information 116 may include user information 1161 for identifying a user who has operated a corresponding player object, course information 1162 for identifying a corresponding course, and character information 1163 for identifying a character selected by a player object.

Information processing apparatus 100 thus generates history information 116 by executing a race.

[F. Control of Operation of Non-Player Object Using History Information]

(f1: Overview)

A player object and at least one non-player object can participate in a race executed in information processing apparatus 100 according to the present embodiment. When a non-player object participates in the race, a behavior including a travel route is controlled based on any history information 116 generated in the past.

FIG. 7 shows an example in which a player object 340 and five non-player objects 342 participate in a race. A character used in the race is associated with each of player object 340 and non-player objects 342.

A behavior of player object 340 during the race is controlled by a user (player) operation whereas a behavior of each of non-player objects 342 during the race is controlled based on associated history information 116.

History information 116 associated with each non-player object 342 is determined by retrieval of history information that satisfies a condition from pieces of history information 116 stored in advance in management server 200 or information processing apparatus 100. For example, initially, at least one competitor (another user) is retrieved (matched) in accordance with a level calculated based on past performance of the user (player), and history information 116 of the retrieved competitor may be obtained from management server 200. Alternatively, a level is calculated for each piece of history information stored in advance, and history information 116 indicating a level similar to the level of the user may be retrieved. Since history information 116 indicating the level similar to the level of the user is selected in any method, player object 340 and non-player object 342 compete each other in the race and users who participate in the race can have more fun. Examples of conditions for retrieval of corresponding history information 116 may thus include the level similar to the level of the user.

In the present embodiment, non-player object 342 does not travel over a route identical to the travel route identified by associated history information 116 but travels depending on a race state resulting from a game event that occurs in the race. More specifically, information processing apparatus 100 determines over which of the travel route identified by associated history information 116 (which is also referred to as the "identical route" below) and a travel route different from the identical route (which is also referred to as the "changed route" below) non-player object 342 is to travel, depending on the race state. Processing for determining the route may be performed at timing of arrival at a predetermined position on the course, timing of occurrence of any game event, or timing when the race state satisfies a predetermined condition.

(1) Selection of a route that goes through a branch section and (2) selection of a route within an identical course will be described below as typical processing for selecting a route.

(f2: Selection of Route that Goes Through Branch Section)

FIGS. 8A to 8C and 9A to 9C show an example in which a shortcut 316 is provided as a branch section in a part of course 302 provided in virtual game stage 300. In a game executed in information processing apparatus 100, travel through shortcut 316 may be based on possession or use of a specific item (of which specific example will be described later) by a game object (a player object and a non-player object).

Even in an example in which the travel route identified by history information 116 associated with the non-player object includes shortcut 316 under such a rule, unless the non-player object possesses or uses the specific item at the time point of arrival in the vicinity of the starting point of shortcut 316, it does not travel through shortcut 316. Information processing apparatus 100 realizes more natural operation control by determining whether or not to travel through shortcut 316, depending on such a race state.

FIGS. 8A to 8C show an example in which travel route 310 identified by history information 116 associated with the non-player object goes through shortcut 316 (FIG. 8A). In this case, as shown in FIG. 8B, an identical route 312 is substantially the same as travel route 310 identified by history information 116. On the other hand, as shown in FIG. 8C, a changed route 314 does not include shortcut 316, unlike travel route 310 identified by history information 116 (that is, identical route 312).

In the example shown in FIGS. 8A to 8C, when an item possessed by the non-player object includes a specific item, information processing apparatus 100 (item management module 158 in FIG. 5) allows the non-player object to use the specific item and information processing apparatus 100 (route determination module 156 in FIG. 5) determines that the non-player object is to travel over identical route 312 (see FIG. 8B).

When the item possessed by the non-player object does not include the specific item, information processing apparatus 100 (route determination module 156 in FIG. 5) determines that the non-player object is to travel over changed route 314 (see FIG. 8C).

Figure 9A:
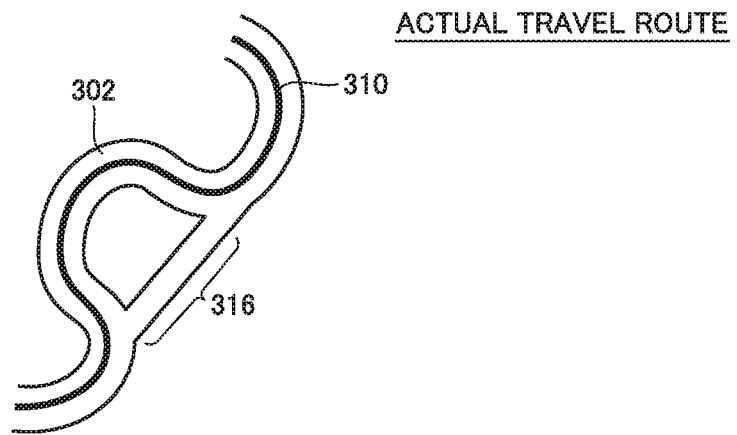
Figure 9B:
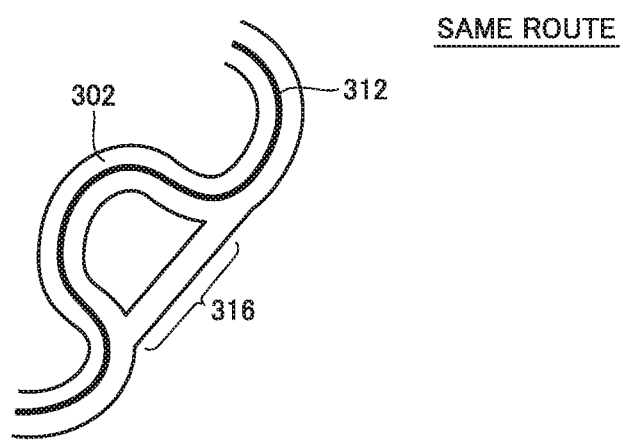
Figure 9C:
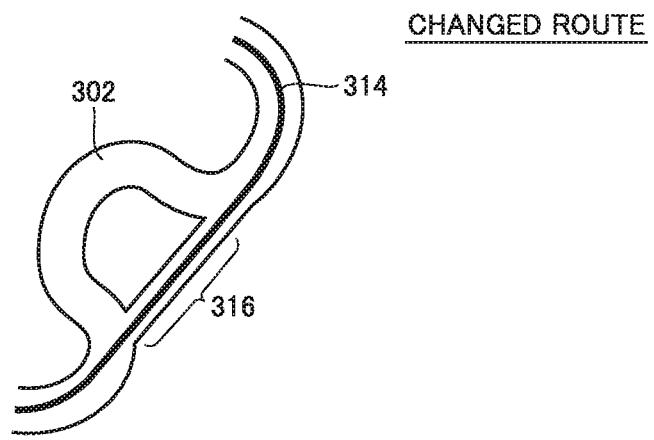

FIGS. 9A to 9C show an example in which travel route 310 identified by history information 116 associated with the non-player object does not go through shortcut 316 (FIG. 9A). In this case, as shown in FIG. 9B, identical route 312 is substantially the same as travel route 310 identified by history information 116 (that is, the route not including shortcut 316). On the other hand, as shown in FIG. 9C, changed route 314 includes shortcut 316, unlike travel route 310 identified by history information 116 (that is, identical route 312). Changed route 314 may thus include shortcut 316 branched off from identical route 312.

In the example shown in FIGS. 9A to 9C, when the item possessed by the non-player object does not include the specific item, information processing apparatus 100 (route determination module 156 in FIG. 5) determines that the non-player object is to travel over identical route 312 (see FIG. 9B).

On the other hand, when the item possessed by the non-player object includes the specific item, information processing apparatus 100 (item management module 158 in FIG. 5) allows the non-player object to use the specific item and information processing apparatus 100 (route determination module 156 in FIG. 5) determines that the non-player object is to travel over changed route 314 (see FIG. 9C).

Figure 10:
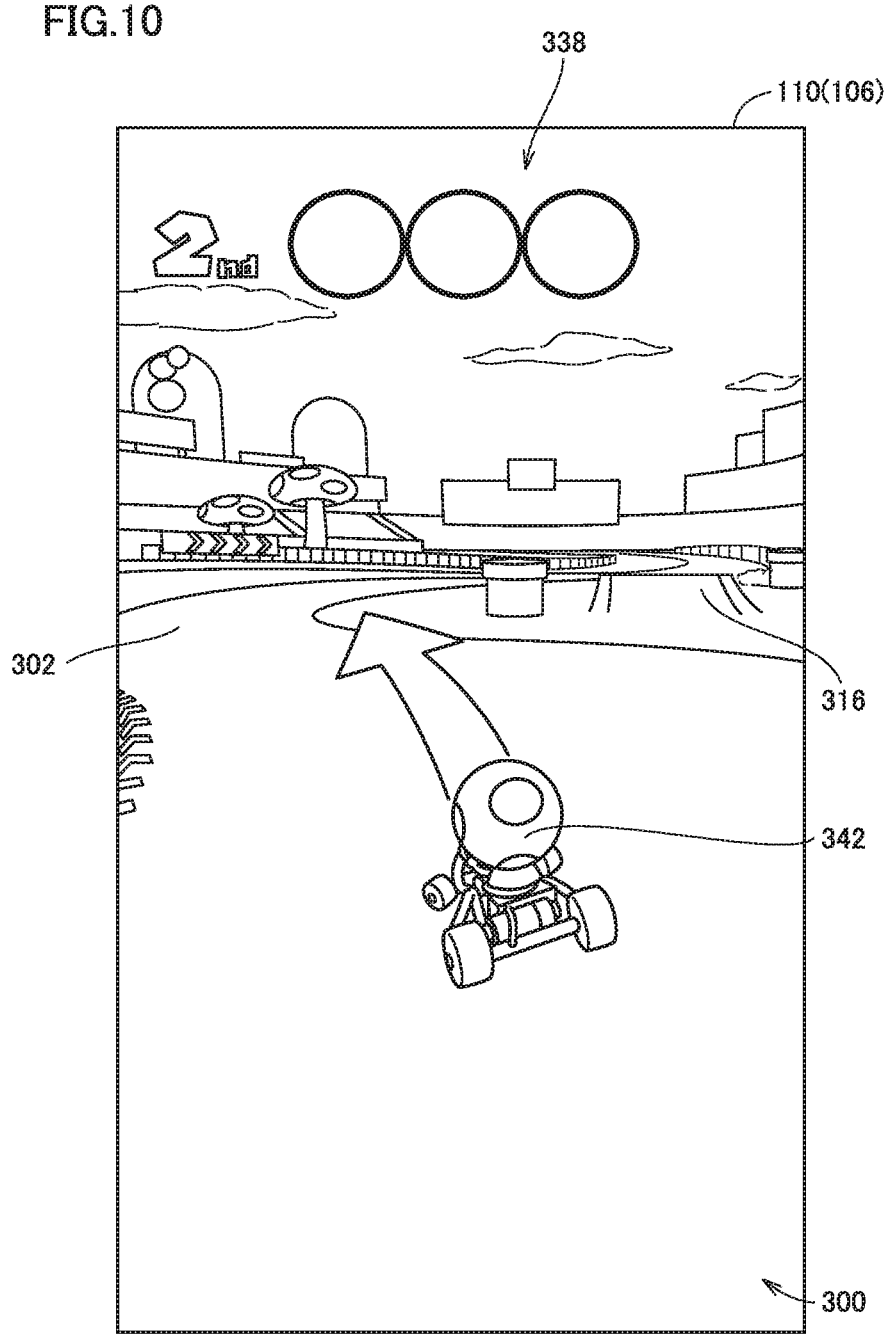
FIGS. 10 and 11 show exemplary illustrative non-limiting screen shots illustrating a scene of the race executed in the information processing apparatus according to the present embodiment.
Figure 11:
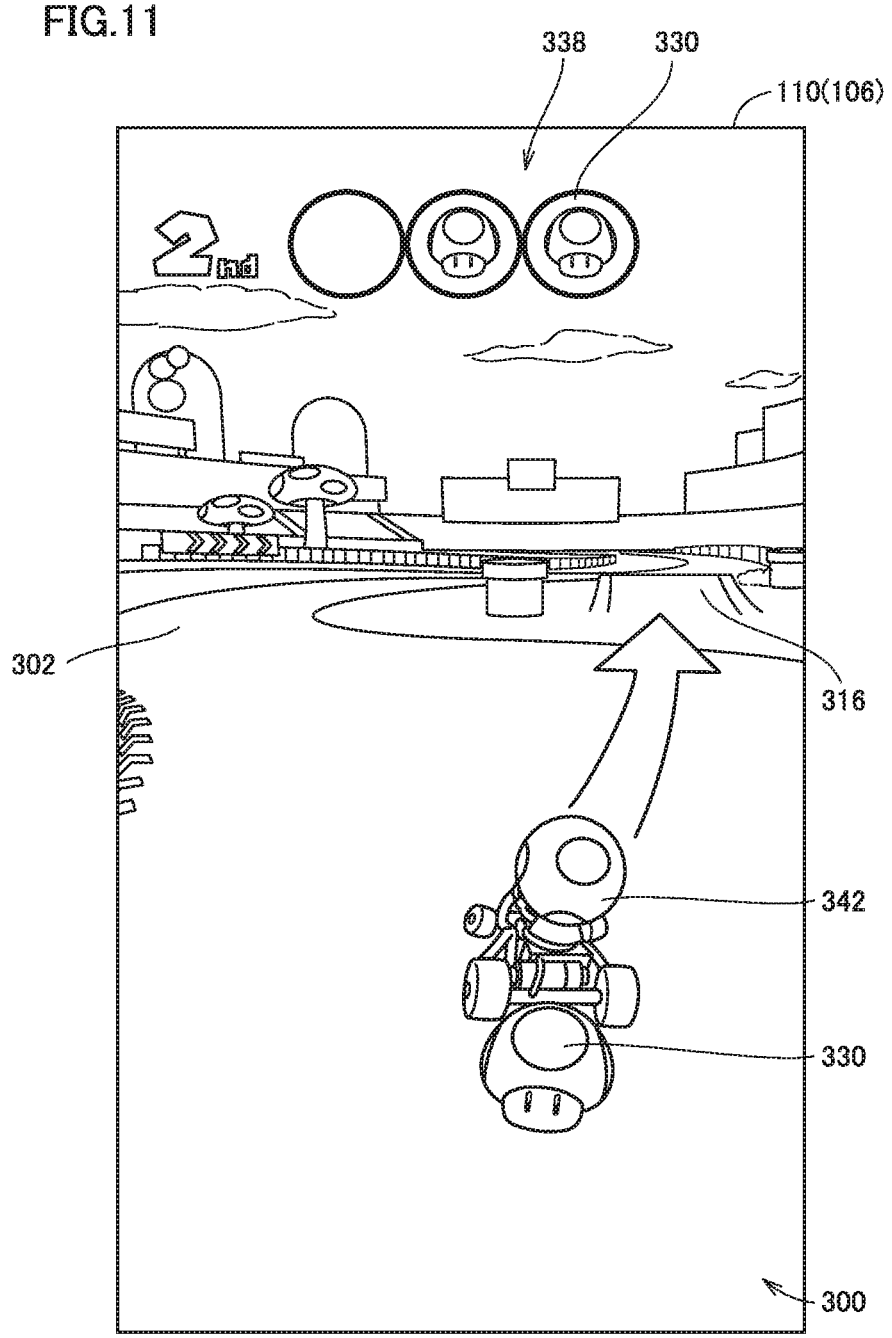

FIG. 10 shows a behavior when the specific item is not used and FIG. 11 shows a behavior when the specific item is used. In the race executed in information processing apparatus 100, travel by non-player object 342 is controlled along course 302 provided in virtual game stage 300.

Referring to FIG. 10, display 106 of information processing apparatus 100 shows a possessed item representation object 338 that shows an item possessed by non-player object 342. In the example shown in FIG. 10, non-player object 342 possesses no item. Therefore, since the non-player object is also unable to use a specific item, it travels over a route (that is, corresponding to changed route 314 in the example shown in FIGS. 8A to 8C and corresponding to identical route 312 in the example shown in FIGS. 9A to 9C) which is not shortcut 316.

In contrast, in the example shown in FIG. 11, non-player object 342 possesses a speed-up item 330 as the specific item and possessed speed-up item 330 is used (speed-up item 330 has been added in the rear of non-player object 342). As speed-up item 330 representing an exemplary specific item is used, non-player object 342 travels over the route including shortcut 316.

The travel route of non-player object 342 is thus selected as appropriate depending on a state of non-player object 342 including possession or use of the specific item.

In order to enhance zest of the race, a special section 318 that provides some change to a speed of travel of a game object may be provided instead of shortcut 316 of course 302.

Figure 12:
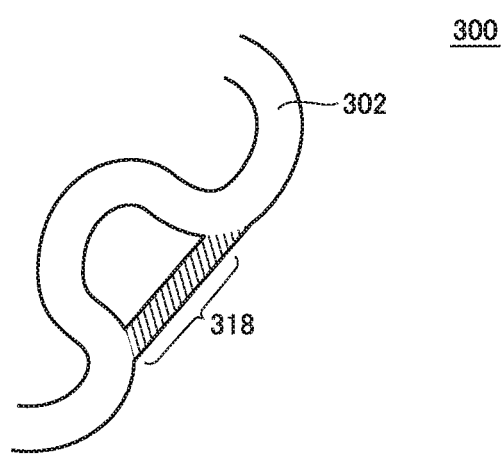
FIG. 12 shows an exemplary illustrative non-limiting drawing illustrating an exemplary course provided in a virtual game stage provided by the information processing apparatus according to the present embodiment.

Referring to FIG. 12, in special section 318 provided in a part of course 302, the game object may be provided with such an effect as lowering in travel speed than in other sections. For example, a dirt course that is off the original course or a course where oil or the like is spread is assumed as special section 318.

Setting may be such that, when a specific item such as speed-up item 330 is used, in spite of travel through special section 318 such as the dirt course, a speed is not lowered (while the specific item used is effective) as compared with a speed when speed-up item 330 is used on a normal route. In other words, so long as the specific item is effective, a travel speed as high as a travel speed when speed-up item 330 is used on the normal route may be achieved whichever route the game object may travel. When special section 318 is provided instead of shortcut 316 and when actual travel route 310 as shown in FIG. 8A is obtained, a speed of travel of the non-player object over identical route 312 (see FIG. 8B) is lower than a speed of travel over changed route 314 (see FIG. 8C). On the other hand, when actual travel route 310 as shown in FIG. 9A is obtained, a speed of travel of the non-player object over identical route 312 (see FIG. 9B) is higher than a speed of travel over changed route 314 (see FIG. 9C).

In the branch section (shortcut 316 or special section 318), any influence may be exerted on operation control of the game object (the player object and/or the non-player object). For example, though an effect of lowering in speed of the game object is illustrated in FIG. 12, to the contrary, an effect of increase in speed of the game object may be provided.

(f3: Selection of Route within Identical Course)

A route may also be changed within the identical course depending on a race state resulting from a game event.

Figure 13A:
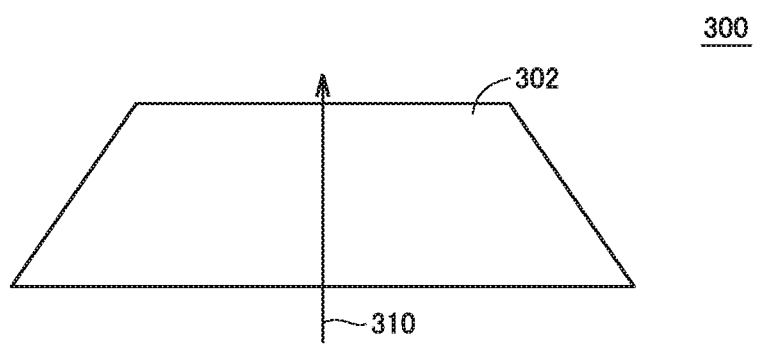
FIGS. 13A and 13B show exemplary illustrative non-limiting drawings illustrating exemplary route selection depending on an obstacle object generated in the virtual game stage provided by the information processing apparatus according to the present embodiment.
Figure 13B:
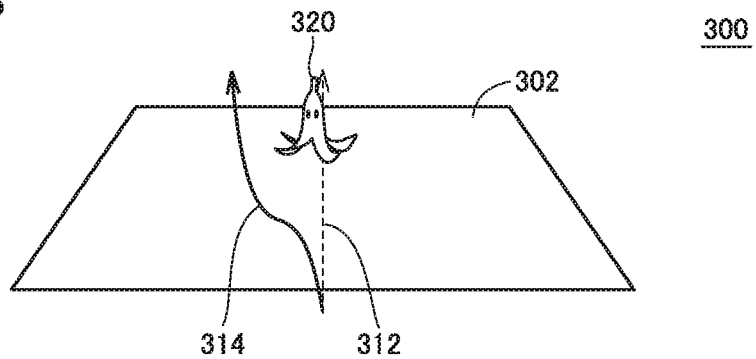

Referring to FIG. 13A, actual travel route 310 of the game object on course 302 is identified by history information 116 associated with the non-player object. Referring to FIG. 13B, an obstacle object 320 may randomly be generated and arranged on course 302 in virtual game stage 300. Obstacle object 320 may be arranged in response to a user operation.

When there is no obstacle object 320 on course 302, the non-player object travels over identical route 312 substantially the same as actual travel route 310. In contrast, when there is obstacle object 320 on course 302, the non-player object travels over changed route 314 different from identical route 312.

Changed route 314 may dynamically be determined depending on a position of obstacle object 320 present on course 302. Alternatively, changed route 314 may statically be determined by providing predetermined modification to identical route 312.

Thus, a state of virtual game stage 300 may be included as an exemplary race state (in this example, whether or not there is obstacle object 320). Then, when there is obstacle object 320 on identical route 312, information processing apparatus 100 (route determination module 156 in FIG. 5) may determine that the non-player object is to travel over changed route 314.

Figure 14A:
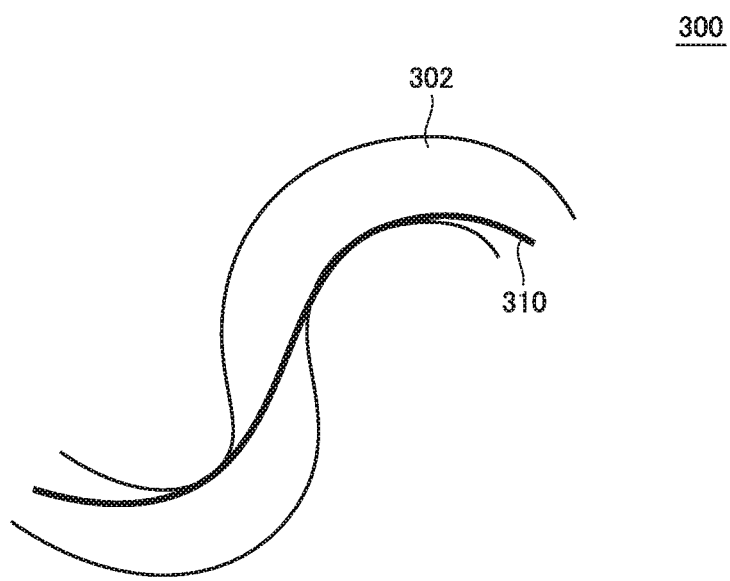
FIGS. 14A and 14B show exemplary illustrative non-limiting drawings illustrating exemplary route selection depending on a state of a game object in the virtual game stage provided by the information processing apparatus according to the present embodiment.

Referring to FIG. 14A, actual travel route 310 of the game object on curved course 302 is identified by history information 116 associated with the non-player object.

Figure 14B:
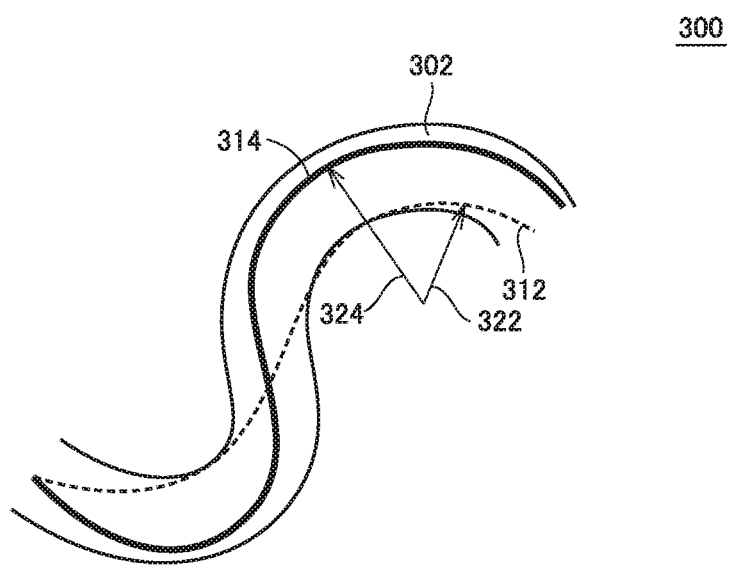

Referring to FIG. 14B, the non-player object is assumed to travel over identical route 312 substantially the same as actual travel route 310. In consideration of travel over a real curve, such a behavior as traveling on the outside or the inside of the curve may be exhibited depending on whether the travel speed is high or low.

Information processing apparatus 100 may change the travel route depending on a state of the non-player object that travels over the curved route. FIG. 14B shows an example in which changed route 314 includes a route different in radius of curvature from identical route 312. More specifically, a radius of curvature 324 of changed route 314 is larger than a radius of curvature 322 of identical route 312. Changed route 314 may thus include a route different in radius of curvature from identical route 312.

The changed route may be selected when travel performance of the non-player object has changed as compared with that in a normal state. The state of the non-player object may include whether or not travel performance of the non-player object has changed as compared with that in the normal state. For example, when the non-player object is lower in speed than in the normal state in connection with travel performance of the non-player object, changed route 314 may be selected instead of identical route 312. Alternatively, when the non-player object is higher in speed than in the normal state in connection with travel performance of the non-player object, changed route 314 may be selected instead of identical route 312.

Which of identical route 312 and changed route 314 is selected may be determined based on steerability (ease in turning) of the non-player object.

Information processing apparatus 100 may thus determine whether or not travel performance of the non-player object representing the state of the non-player object has changed as compared with that in the normal state, and determine over which of identical route 312 and changed route 314 the non-player object is to travel.

Changed route 314 may dynamically be determined depending on travel performance of the non-player object. Alternatively, changed route 314 may statically be determined by providing predetermined modification to identical route 312.

Without being limited to change in state described above, over which of identical route 312 and changed route 314 the non-player object is to travel may be determined based on any state of virtual game stage 300 and/or any state of the non-player object. For example, the route may be changed depending on a factor that is randomly varied for each race, such as dirt, a position of an obstacle, or rain over the course (slippery condition).

The route may be changed depending on ranking in a race. For example, such processing can be performed that, even though a game object has traveled over shortcut 316 in a previous race, when ranking is high in a subsequent race, the game object does not travel over shortcut 316.

[G. Specific Item]

An exemplary specific item generated while a game proceeds in information processing apparatus 100 according to the present embodiment will now be described.

(g1: Type of Specific Item)

Referring to FIG. 15, speed-up item 330 and a travel permission item 332 are illustrated as specific items.

When speed-up item 330 is used, it produces an effect of increase in travel speed of the game object (the player object and/or the non-player object). Speed-up item 330 increases the travel speed of the non-player object as compared with a travel speed when the non-player object does not use speed-up item 330.

When travel permission item 332 is used, it permits the game object (the player object and/or the non-player object) to travel over a route where the game object is normally not permitted to travel. For example, as travel permission item 332 is used, such a behavior as jumping over a hole provided in the route or an effect of breaking an obstacle arranged on the route may be activated. Travel permission item 332 permits travel over a route where the non-player object is not permitted to travel without use of travel permission item 332.

Use of both of speed-up item 330 and travel permission item 332 shown in FIG. 15 does not have to be permitted but use of any one of them may be permitted. In contrast, in addition to the specific items shown in FIG. 15, use of another specific item may be permitted. Furthermore, without being limited to the specific item, use of any item may be permitted.

(g2: Promotion/Suppression of Use of Item)

An item including a specific item is provided to the game object (the player object and/or the non-player object) based on a probability, as a game event that occurs in a race executed in information processing apparatus 100. The game event may include providing the non-player object with an item based on a probability in the race. A state of an item possessed by each game object by providing the non-player object with the item as such corresponds to the state of the non-player object.

Figure 16A:
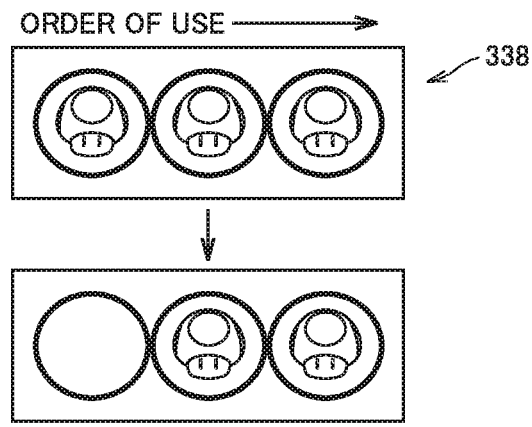
FIGS. 16A to 16C show exemplary illustrative non-limiting drawings illustrating exemplary processing involved with possession and use of an item in the race executed in the information processing apparatus according to the present embodiment.

Referring to FIG. 16A, while the game proceeds, possessed item representation object 338 showing an item possessed by each game object may be shown. In the example shown in FIGS. 16A to 16C, the item is used from the left in possessed item representation object 338. In other words, a direction from the left to the right of possessed item representation object 338 represents the order of use. FIG. 16A shows a state that the leftmost item is used and the number of possessed items decreases from three in the initial state to two.

The item possessed by the game object (the player object and/or the non-player object) is thus used in accordance with a predetermined order of use.

An item of the player object is used in response to an explicit operation by a user. Without the explicit operation for use, a corresponding effect may be produced simply by possession of the item by the player object or at the moment of acquisition.

As described above, over which route the non-player object is to travel is determined depending on whether or not the non-player object possesses a specific item. Therefore, use of the item by the non-player object may be controlled with the vicinity of the branch section being defined as the reference.

Figure 16B:
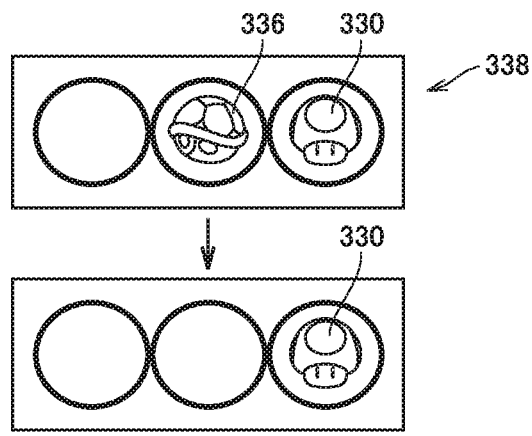

In the example shown in FIG. 16B, the non-player object possesses a normal item 336 and speed-up item 330 representing an exemplary specific item. At this time, speed-up item 330 is in a second position in the order of use. Even though the non-player object uses the item at the time point of arrival in the vicinity of the branch section, the item that is used is normal item 336, not speed-up item 330.

For more natural operation control (that is, for realizing an operation that would be performed by a real player), the non-player object may be caused to use normal item 336 first and then to use speed-up item 330 at the time point of arrival in the vicinity of the branch section. Thus, when the specific item (for example, speed-up item 330) possessed by the non-player object is in a position second or later in the order of use, until the specific item is in a position first in the order of use, information processing apparatus 100 (item management module 158 in FIG. 5) may cause the non-player object to use an item other than the specific item (for example, normal item 336) earlier than when the specific item is not included.

Figure 16C:
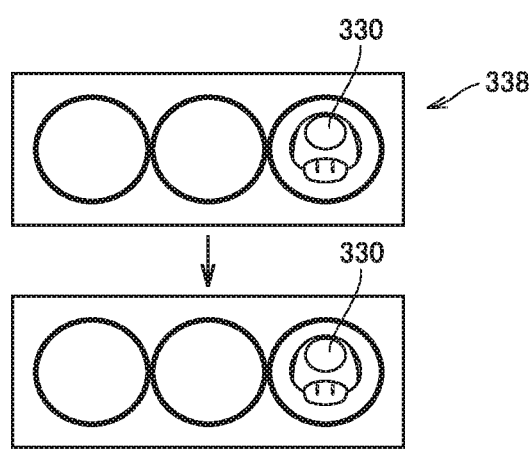

In the example shown in FIG. 16C, the non-player object possesses only speed-up item 330 representing an exemplary specific item. Speed-up item 330 at this time is in a position first in the order of use. When the non-player object uses speed-up item 330 before it arrives in the vicinity of the branch section, it is unable to use speed-up item 330 in the vicinity of the branch section.

For more natural operation control (that is, for realizing an operation that would be performed by a real player), timing of use of speed-up item 330 by the non-player object may be delayed until it arrives in the vicinity of the branch section. When the specific item (for example, speed-up item 330) possessed by the non-player object is in a position first in the order of use, information processing apparatus 100 (item management module 158 in FIG. 5) may allow the non-player object to hold the specific item until it arrives in the vicinity of the branch section (that is, in the vicinity of the starting point of changed route 314).

As described above, by promoting or suppressing use of an item including a specific item by the non-player object, zest of a race can be enhanced.

[H. Processing Procedure]

A procedure of processing performed in information processing apparatus 100 of game system 1 according to the present embodiment will now be described in further detail.

Figure 17:
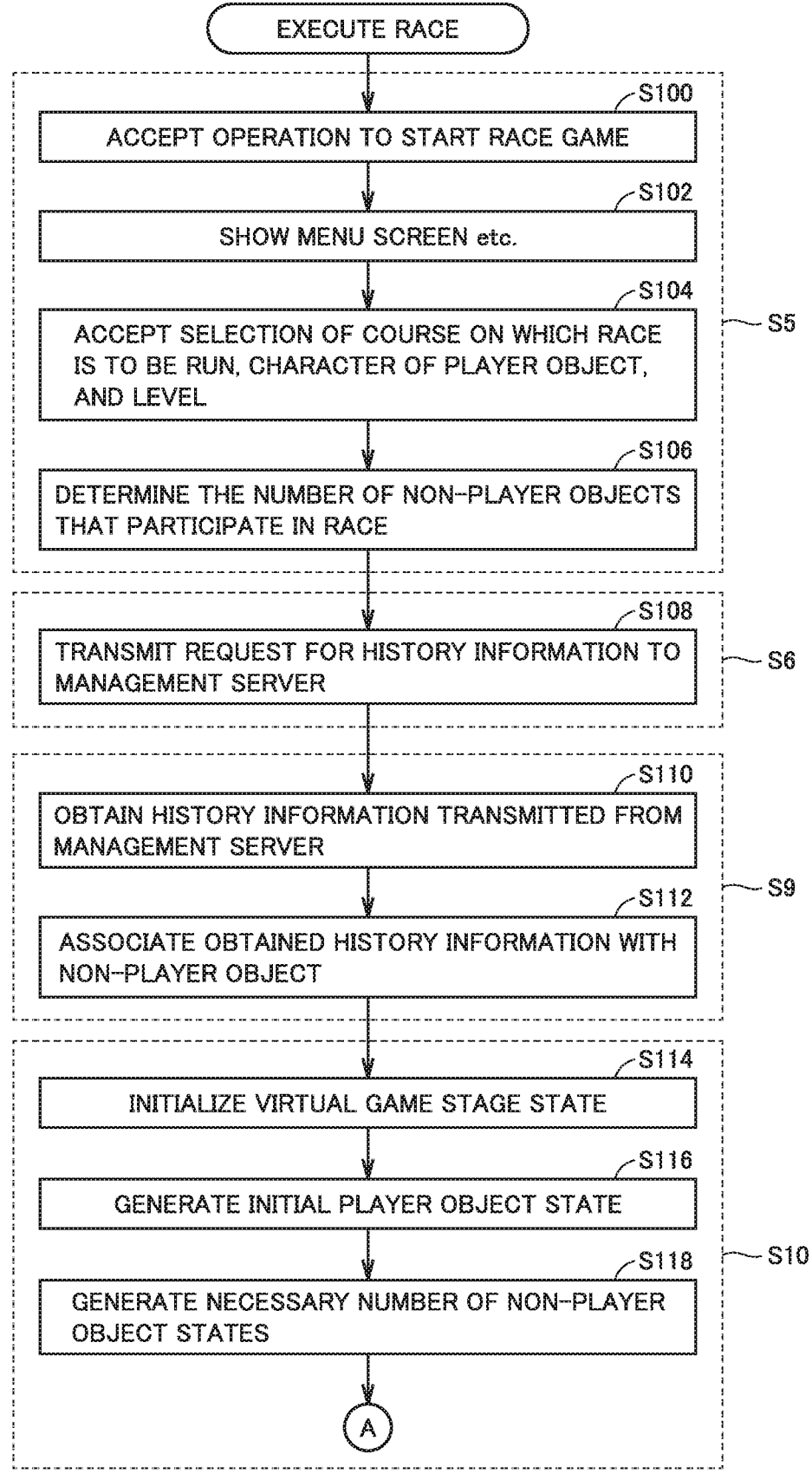
FIGS. 17 and 18 show exemplary illustrative non-limiting flowcharts illustrating a procedure of processing performed in the information processing apparatus according to the embodiment.
Figure 18:
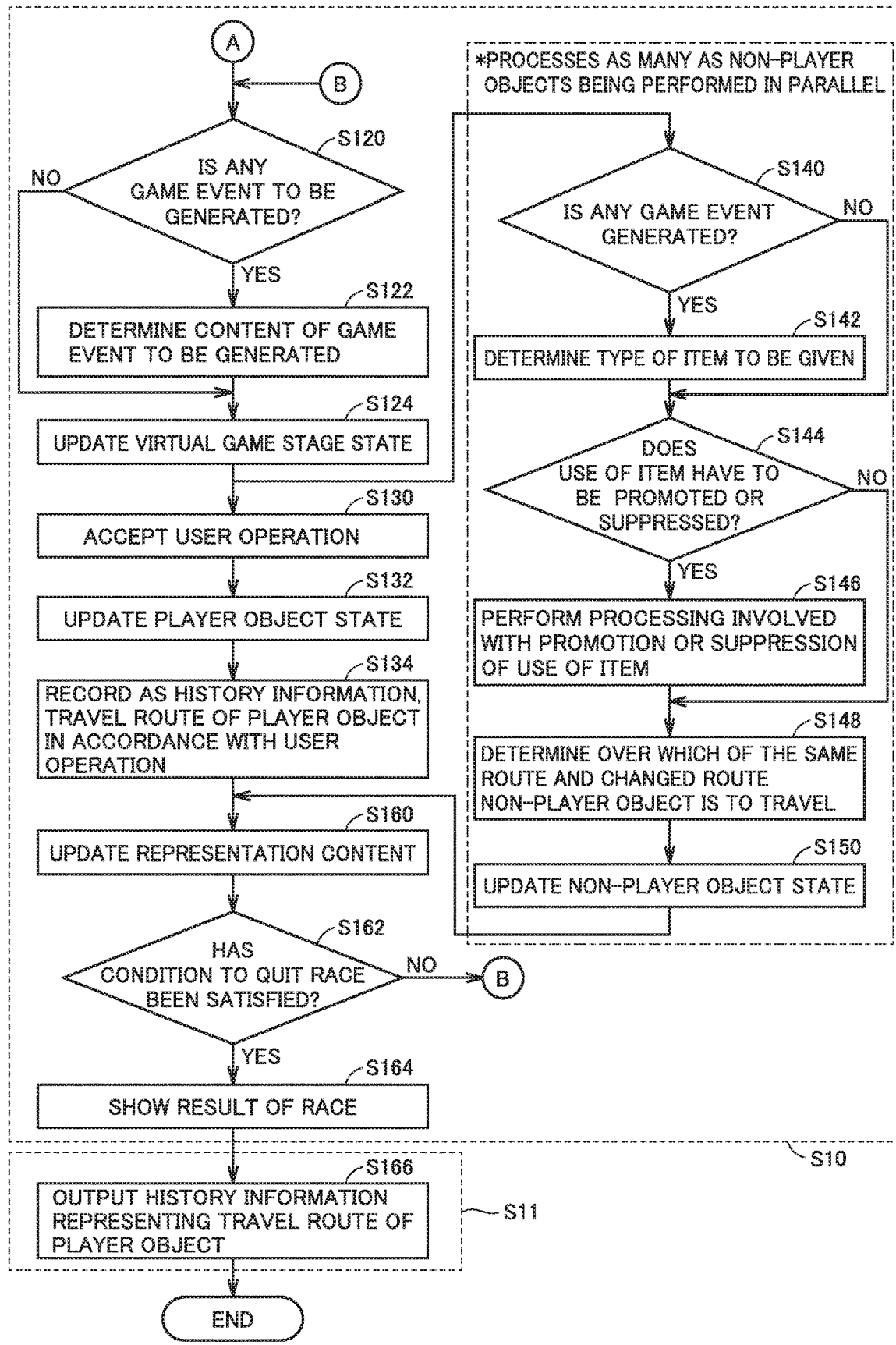

FIGS. 17 and 18 show an information processing method performed by the computer of information processing apparatus 100.

Each step shown in FIGS. 17 and 18 is typically performed by execution of an information processing program (system program 112 and/or application program 114) by processor 102 of information processing apparatus 100. Description will be given below in correspondence with the sequence chart shown in FIG. 3.

Referring to FIGS. 17 and 18, information processing apparatus 100 accepts an operation to start a race from a user (step S5). More specifically, when information processing apparatus 100 accepts the operation to start a race game (step S100), it has a menu screen or the like shown (step S102) and accepts selection of a course on which the race is run, a character of a player object, and a level (step S104).

In succession, information processing apparatus 100 determines the number of non-player objects that will participate in the race other than the player object (step S106) and transmits a request for history information for obtaining history information to be associated with each non-player object to management server 200 (step S108) (corresponding to step S6 shown in FIG. 3). Information processing apparatus 100 obtains the history information transmitted from management server 200 in response to the request for history information (step S110) and associates the obtained history information with the non-player object (step S112) (corresponding to step S9 shown in FIG. 3).

In succession, information processing apparatus 100 performs preparation processing for starting the race. Specifically, information processing apparatus 100 initializes a virtual game stage state 166 representing a state of virtual game stage 300 in accordance with contents of selection by the user (step S114) and generates initial player object state 162 (step S116). Information processing apparatus 100 generates a necessary number of non-player object states 164 (step S118).

In succession, information processing apparatus 100 starts processing involved with execution of the race. More specifically, information processing apparatus 100 determines whether or not to generate some kind of game event based on a generated random number (step S120). When it is determined that some kind of game event should be generated (YES in step S120), information processing apparatus 100 determines contents of the game event to be generated (step S122). When it is not determined that some kind of game event should be generated (NO in step S120), processing in step S122 is skipped. Information processing apparatus 100 updates virtual game stage state 166 representing the state of virtual game stage 300 in consideration also of contents in step S122 (step S124).

Processing in steps S130 to S134 is performed for the player object and processing in steps S140 to S150 is performed for each non-player object. Processes as many as the number of non-player objects in steps S140 to S150 are performed in parallel.

For the player object, information processing apparatus 100 accepts a user operation (step S130), and updates player object state 162 representing a position, a travel speed, and a state of possession of an item of player object 340 in accordance with the accepted user operation (step S132). Information processing apparatus 100 records as history information, a travel route of player object 340 in accordance with the user operation (step S134).

For the non-player object, information processing apparatus 100 determines whether or not to provide some kind of item based on a generated random number (step S140). When it is determined that some kind of item should be provided (YES in step S140), information processing apparatus 100 determines a type of an item to be provided (step S142). When it is determined that no item should be provided (NO in step S140), processing in step S142 is skipped.

Information processing apparatus 100 determines whether to promote or suppress use of an item based on whether or not an item possessed by the non-player object includes a specific item and (when included) the order of use of the specific item (step S144). When it is determined that use of the item should be promoted or suppressed (YES in step S144), information processing apparatus 100 performs processing involved with promotion or suppression of use of the item (step S146) (see FIGS. 16A to 16C).

Information processing apparatus 100 determines over which of identical route 312 identified by the associated history information and changed route 314 different from identical route 312 the non-player object is to travel, depending on a race state (including the state of player object 340) resulting from the game event (step S148).

Then, information processing apparatus 100 updates non-player object state 164 representing a position, a travel speed, and a state of possession of the item of non-player object 342 (step S150).

Then, information processing apparatus 100 updates contents of representation based on virtual game stage state 166, player object state 162, and non-player object state 164 (step S160). Information processing apparatus 100 determines whether or not a condition for quitting the race has been satisfied (step S162). When the condition for quitting the race has not been satisfied (NO in step S162), processing in step S120 or later is repeated.

When the condition for quitting the race has been satisfied (YES in step S162), information processing apparatus 100 shows a result of the race (step S164) and outputs history information representing the travel route of player object 340 (step S166).

Then, the process ends.

[I. Modification]

Though history information 116 (see steps S1 to S4 in FIG. 3) obtained in the previously run race has mainly been described as including the travel route of the player object in the processing procedure shown in FIGS. 17 and 18, the history information may include the travel route of the non-player object (that is, a result of operation control by information processing apparatus 100).

The race run previously for obtaining history information 116 is not limited to a race in which a plurality of game objects compete with one another, and the race may be a race run by a player object or a non-player object alone (a kind of time trial). The previously run race does not have to exhibit randomness (that is, the same result may be output in response to the same input).

History information 116 obtained in the previous race and used for execution of one race may be history information 116 of the same user. In this case, a non-player object that exhibits a behavior similar to the behavior obtained by operations in a past play by one user is set as a competitor of that user. In this case, the user can compete as if the user competed with the past user himself/herself.

When history information 116 is stored in storage 110 of information processing apparatus 100 and when a plurality of users use identical information processing apparatus 100, non-player objects that exhibit behaviors similar to the behaviors of the users who have previously run the race can also be set as competitors. In this case, one information processing apparatus 100 can be used to run the race as if a plurality of users run the race.

As shown in FIGS. 10 and 11, a character associated with a game object (a player object and a non-player object) who participates in a race may arbitrarily be selected. In this case, by storing information for identifying a character in correspondence with history information 116, when a character is selected, appropriate history information 116 can be selected from pieces of history information 116 corresponding to the selected character. History information 116 corresponding to a character different from the selected character may also be selected.

In the sequence chart shown in FIG. 3, a race is executed by using history information stored in management server 200. History information held in management server 200, however, does not necessarily have to be downloaded to information processing apparatus 100. For example, a race may be executed by referring to history information stored in management server 200 each time. Alternatively, one piece of history information or a plurality of pieces of history information directed to one information processing apparatus 100 may be shared with another information processing apparatus 100.

A travel speed of a non-player object may be different from a travel speed in a race in which corresponding history information has been obtained. For example, when the non-player object is reduced in speed by being hit by such an item as interfering travel during the race, the non-player object may be controlled to increase in speed in order to make up for the delay.

During the race, the travel route may be selected as appropriate in relation with another game object (the player object and/or the non-player object). For example, when there is a game object in a special state (for example, an unbeatable state) around a non-player object, contact with that game object in the special state will bring about crash or going off course. Therefore, such a travel route as avoiding the game object in such a special state may be selected.

During the race, when another game object (the player object and/or the non-player object) comes closer from behind a non-player object, in order to prevent overtaking, such a travel route as interfering a path of another game object may be selected.

In an example where history information 116 records the fact that the game object exhibited a special behavior (for example, travel through a gliding route above the route) but the special behavior was canceled (for example, drop onto the normal route) due to attack from another game object during the special behavior, return to the special behavior recorded in history information 116 after cancellation is unnatural. Therefore, the normal route rather than the gliding route may be selected as the travel route.

In such a race as going around the same course a plurality of times, in accordance with a travel route in one lap in the previously run race, a travel route in another lap in a subsequently run race may be determined. In an example where, in the first lap of the previous race, a specific item was used to travel through shortcut 316 but in the second lap, the game object possessed no specific item and was not permitted to travel through shortcut 316, on condition that a game object possesses a specific item in the second lap of the subsequent race, it may travel through shortcut 316. The route may thus be selected or determined by using history information in different laps.

[J. Advantages]

According to the present embodiment, while using history information that allows identification of a travel route of a game object in a previously run race, in a subsequent race, over which of a first travel route identified by the history information obtained in the previous race and a second travel route different from the first travel route a non-player object is to travel is determined depending on a race state resulting from a game event that occurs in the subsequent race. By thus selecting a travel route depending on a race state resulting from a game event, more natural operation control in accordance with a condition of a race executed in the virtual game stage can be achieved.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A non-transitory computer-readable storage medium with an executable information processing program stored thereon, the information processing program, when executed by a computer of an information processing apparatus, causing the computer to perform:
    obtaining at least one piece of history information that allows identification of a first travel route over which a game object has traveled in a first race run in a virtual game stage;
    executing a second race run in the virtual game stage where a game event occurs independently of the first race, a player object and at least one non-player object participating in the second race;
    associating the history information with the non-player object for the second race;
    determining in the second race, over which of the first travel route identified by the associated history information and a second travel route different from the first travel route the non-player object is to travel, depending on a race state resulting from the game event that occurs in the second race; and
    managing an item possessed by the non-player object, the race state including a state of the item possessed by the non-player object.

2. The non-transitory computer-readable storage medium according to claim 1, wherein
    the determining includes determining, when the item possessed by the non-player object does not include a specific item, that the non-player object is to travel over the second travel route.

3. The non-transitory computer-readable storage medium according to claim 2, wherein
    the managing the item includes allowing, when the item possessed by the non-player object includes the specific item, the non-player object to use the specific item, and
    the determining includes determining that the non-player object is to travel over the first travel route.

4. The non-transitory computer-readable storage medium according to claim 3, wherein
    the first travel route is a travel route where a travel speed of the non-player object is lowered as compared with a speed of travel over the second travel route.

5. The non-transitory computer-readable storage medium according to claim 1, wherein
    the managing the item includes allowing, when the item possessed by the non-player object includes a specific item, the non-player object to use the specific item, and
    the determining includes determining that the non-player object is to travel over the second travel route.

6. The non-transitory computer-readable storage medium according to claim 5, wherein
    the determining includes determining, when the item possessed by the non-player object does not include the specific item, that the non-player object is to travel over the first travel route.

7. The non-transitory computer-readable storage medium according to claim 5, wherein
    the first travel route is a travel route where a travel speed of the non-player object is increased as compared with a speed of travel over the second travel route.

8. The non-transitory computer-readable storage medium according to claim 2, wherein
    the specific item serves to increase a travel speed of the non-player object as compared with a travel speed when the non-player object does not use the specific item.

9. The non-transitory computer-readable storage medium according to claim 2, wherein
    the specific item permits travel over a route where the non-player object is not permitted to travel without use of the specific item by the non-player object.

10. The non-transitory computer-readable storage medium according to claim 2, wherein
    the managing the item includes
        allowing use of the item possessed by the non-player object in accordance with a predetermined order of use, and
        when the specific item possessed by the non-player object is in a position second or later in the order of use, until the specific item is in a position first in the order of use, causing the non-player object to use an item other than the specific item earlier than when the specific item is not included.

11. The non-transitory computer-readable storage medium according to claim 2, wherein
    the managing the item includes allowing the non-player object to continue to possess the specific item until the non-player object reaches vicinity of a starting point of the second travel route when the specific item possessed by the non-player object is in a position first in the order of use.

12. The non-transitory computer-readable storage medium according to claim 1, wherein
the game event includes providing the item to the non-player object based on a probability in the second race.

13. The non-transitory computer-readable storage medium according to claim 1, wherein
the second travel route includes a route branched off from the first travel route.

14. The non-transitory computer-readable storage medium according to claim 1, wherein
the race state includes whether travel performance of the non-player object has changed as compared with travel performance in a normal state.

15. The non-transitory computer-readable storage medium according to claim 14, wherein
the travel performance includes setting the non-player object to a lower-speed state than in the normal state.

16. The non-transitory computer-readable storage medium according to claim 1, wherein
the race state includes a state of the virtual game stage.

17. The non-transitory computer-readable storage medium according to claim 1, wherein
the determining includes determining, when there is an obstacle object on the first travel route, that the non-player object is to travel over the second travel route.

18. The non-transitory computer-readable storage medium according to claim 1, wherein
the second travel route includes a route different in radius of curvature from the first travel route.

19. The non-transitory computer-readable storage medium according to claim 1, wherein
the history information includes at least one of information on a position of the game object and information on input information.

20. An information processing apparatus comprising:
a memory storing a computer-readable program thereon; and
one or more processors, when executing the computer-readable program, that perform
obtaining at least one piece of history information that allows identification of a first travel route over which a game object has traveled in a first race run in a virtual game stage,
executing a second race run in the virtual game stage where a game event occurs independently of the first race, a player object and at least one non-player object participating in the second race,
associating the history information with the non-player object for the second race,
determining in the second race, over which of the first travel route identified by the associated history information and a second travel route different from the first travel route the non-player object is to travel, depending on a race state resulting from the game event that occurs in the second race, and
managing an item possessed by the non-player object,
a state of the non-player object including a state of the item possessed by the non-player object.

21. An information processing system comprising:
a display;
an input device; and
a processing unit that communicates with the display and the input device,
the processing unit being configured to
obtain at least one piece of history information that allows identification of a first travel route over which a game object has traveled in a first race run in a virtual game stage,
execute a second race run in the virtual game stage where a game event occurs independently of the first race, a player object and at least one non-player object participating in the second race,
associate the history information with the non-player object for the second race,
determine in the second race, over which of the first travel route identified by the associated history information and a second travel route different from the first travel route the non-player object is to travel, depending on a race state resulting from the game event that occurs in the second race, and
manage an item possessed by the non-player object,
a state of the non-player object including a state of the item possessed by the non-player object.

22. An information processing method performed in a computer of an information processing apparatus comprising:
obtaining at least one piece of history information that allows identification of a first travel route over which a game object has traveled in a first race run in a virtual game stage;
executing a second race run in the virtual game stage where a game event occurs independently of the first race, a player object and at least one non-player object participating in the second race;
associating the history information with the non-player object for the second race;
determining in the second race, over which of the first travel route identified by the associated history information and a second travel route different from the first travel route the non-player object is to travel, depending on a race state resulting from the game event that occurs in the second race; and
managing an item possessed by the non-player object,
a state of the non-player object including a state of the item possessed by the non-player object.

* * * * *